United States Patent
Hygh et al.

(10) Patent No.: US 10,275,036 B2
(45) Date of Patent: Apr. 30, 2019

(54) MODULAR SENSING DEVICE FOR CONTROLLING A SELF-PROPELLED DEVICE

(71) Applicant: Sphero, Inc., Boulder, CO (US)

(72) Inventors: David Hygh, Boulder, CO (US); Jeffrey Wiencrot, Boulder, CO (US); Ian H. Bernstein, Boulder, CO (US)

(73) Assignee: Sphero, Inc., Boulder, CO (US)

( * ) Notice: Subject to any disclaimer, the term of this patent is extended or adjusted under 35 U.S.C. 154(b) by 0 days.

(21) Appl. No.: 15/253,778

(22) Filed: Aug. 31, 2016

(65) Prior Publication Data

US 2017/0192517 A1    Jul. 6, 2017

Related U.S. Application Data

(60) Provisional application No. 62/274,514, filed on Jan. 4, 2016, provisional application No. 62/346,216, filed on Jun. 6, 2016.

(51) Int. Cl.
    *G06F 3/01*    (2006.01)
    *G08B 7/06*    (2006.01)
    (Continued)

(52) U.S. Cl.
    CPC .............. *G06F 3/017* (2013.01); *A63F 13/21* (2014.09); *A63F 13/211* (2014.09);
    (Continued)

(58) Field of Classification Search
    CPC .......... G06F 3/017; G06F 1/163; G06F 3/016; G06F 3/0346; G06F 3/0485; G06F 3/167;
    (Continued)

(56) References Cited

U.S. PATENT DOCUMENTS 9,141,150 B1    9/2015 Trundle
9,599,992 B2 *  3/2017 Kohstall ................ G05D 1/101
                (Continued)

FOREIGN PATENT DOCUMENTS

EP       2876907           5/2015
KR    10-2012-0006160       1/2012
                (Continued)

OTHER PUBLICATIONS

PCT International Search Report and Written Opinion in PCT/US2017/020762, dated May 24, 2017, 16 pages.
(Continued)

*Primary Examiner* — Richard M Camby

(74) *Attorney, Agent, or Firm* — Merchant & Gould P.C.

(57) ABSTRACT

A wearable device can be worn by a user, and can include one or more sensors to detect user gestures performed by the user. The wearable device can further include a wireless communication module to establish a communication link with a self-propelled device, and a controller that can generate control commands based on the user gestures. The control commands may be executable to accelerate and maneuver the self-propelled device. The controller may then transmit the control commands to the self-propelled device over the communication link for execution by the self-propelled device.

19 Claims, 13 Drawing Sheets

(51) Int. Cl.
    *A63F 13/21* (2014.01)
    *A63F 13/28* (2014.01)
    *A63F 13/32* (2014.01)
    *A63H 17/26* (2006.01)
    *A63H 23/04* (2006.01)
    *A63H 27/00* (2006.01)
    *A63H 30/04* (2006.01)
    *A63H 33/00* (2006.01)
    *G05D 1/00* (2006.01)
    *G06F 1/16* (2006.01)
    *G06F 3/0346* (2013.01)
    *G06F 3/0485* (2013.01)
    *G06F 3/16* (2006.01)
    *A63F 13/211* (2014.01)
    *A63F 13/235* (2014.01)
    *G06F 3/02* (2006.01)
    *G06F 3/038* (2013.01)
    *G08C 17/02* (2006.01)
    *H04W 8/00* (2009.01)
    *A63F 13/212* (2014.01)
    *H04W 4/80* (2018.01)
    *G06F 3/0488* (2013.01)
    *H04W 84/18* (2009.01)
    *H04L 12/28* (2006.01)

(52) U.S. Cl.
    CPC .......... *A63F 13/212* (2014.09); *A63F 13/235* (2014.09); *A63F 13/28* (2014.09); *A63F 13/32* (2014.09); *A63H 17/26* (2013.01); *A63H 23/04* (2013.01); *A63H 27/00* (2013.01); *A63H 27/12* (2013.01); *A63H 30/04* (2013.01); *A63H 33/005* (2013.01); *G05D 1/0016* (2013.01); *G06F 1/163* (2013.01); *G06F 1/1694* (2013.01); *G06F 3/016* (2013.01); *G06F 3/02* (2013.01); *G06F 3/038* (2013.01); *G06F 3/0346* (2013.01); *G06F 3/0485* (2013.01); *G06F 3/167* (2013.01); *G08B 7/06* (2013.01); *G08C 17/02* (2013.01); *H04W 4/80* (2018.02); *H04W 8/005* (2013.01); *A63F 2300/405* (2013.01); *A63F 2300/8082* (2013.01); *G05D 2201/0214* (2013.01); *G06F 3/04883* (2013.01); *G08C 2201/32* (2013.01); *G08C 2201/92* (2013.01); *H04L 12/2803* (2013.01); *H04W 84/18* (2013.01)

(58) Field of Classification Search
    CPC ........ G06F 3/02; G06F 3/038; G06F 3/04883; A63F 13/21; A63F 13/28; A63F 13/32; A63F 13/211; A63F 13/235; A63F 2300/405; A63F 2300/8082; A63H 17/26; A63H 23/04; A63H 27/00; A63H 27/12; A63H 30/04; A63H 33/005; G08C 17/02; G08C 2201/32; G08C 2201/92; G08B 7/06; G05D 1/0016; G05D 2201/0214; H04L 12/2803
See application file for complete search history.

(56) References Cited

U.S. PATENT DOCUMENTS

| | | | |
|---|---|---|---|
| 9,663,227 B1* | 5/2017 | Lema .................. | B64C 39/024 |
| 2004/0047244 A1 | 3/2004 | Iino | |
| 2009/0222149 A1* | 9/2009 | Murray .................. | A63H 30/04 |
| | | | 701/2 |
| 2010/0124949 A1 | 5/2010 | Demuynck et al. | |
| 2010/0156676 A1 | 6/2010 | Mooring | |
| 2011/0090407 A1 | 4/2011 | Lee | |
| 2011/0159939 A1 | 6/2011 | Lin et al. | |
| 2011/0205156 A1 | 8/2011 | Gomez et al. | |
| 2011/0312311 A1 | 12/2011 | Abifaker et al. | |
| 2012/0168241 A1 | 7/2012 | Bernstein et al. | |
| 2012/0242481 A1 | 9/2012 | Gernandt et al. | |
| 2014/0008496 A1 | 1/2014 | Zhou et al. | |
| 2014/0020964 A1 | 1/2014 | Bernstein et al. | |
| 2014/0143784 A1 | 5/2014 | Mistry et al. | |
| 2014/0155162 A1 | 6/2014 | Mattice | |
| 2014/0180582 A1 | 6/2014 | Pontarelli | |
| 2014/0347265 A1 | 11/2014 | Aimone et al. | |
| 2014/0371906 A1 | 12/2014 | Barajas | |
| 2015/0026647 A1 | 1/2015 | Park et al. | |
| 2015/0054630 A1 | 2/2015 | Xu et al. | |
| 2015/0062086 A1 | 3/2015 | Rohildev | |
| 2015/0077336 A1 | 3/2015 | Elangovan | |
| 2015/0304785 A1 | 10/2015 | Gan et al. | |
| 2015/0338925 A1 | 11/2015 | Bernstein et al. | |
| 2016/0207454 A1 | 7/2016 | Cuddihy | |
| 2016/0260431 A1 | 9/2016 | Newendorp | |
| 2016/0299572 A1 | 10/2016 | Grover et al. | |
| 2016/0313742 A1* | 10/2016 | Wang .................. | G05D 1/0669 |
| 2016/0313801 A1 | 10/2016 | Wagner et al. | |
| 2017/0031446 A1* | 2/2017 | Clark .................. | G05D 1/0016 |
| 2017/0064181 A1* | 3/2017 | Zhang .................. | B64C 39/024 |
| 2017/0147077 A1 | 5/2017 | Park et al. | |
| 2017/0180537 A1 | 6/2017 | Heo | |
| 2017/0189803 A1 | 7/2017 | Atwell et al. | |
| 2017/0189824 A1 | 7/2017 | Godby et al. | |
| 2017/0192516 A1 | 7/2017 | Godby et al. | |
| 2017/0192518 A1 | 7/2017 | Hygh et al. | |
| 2017/0193813 A1 | 7/2017 | Carroll et al. | |

FOREIGN PATENT DOCUMENTS

| | | |
|---|---|---|
| KR | 10-2015-0063998 | 6/2015 |
| WO | 2015060856 | 4/2015 |
| WO | 2015094220 | 6/2015 |
| WO | 2015102467 | 7/2015 |

OTHER PUBLICATIONS

PCT International Search Report and Written Opinion in PCT/US2017/020771, dated Jul. 12, 2017, 17 pages.
PCT International Search Report and Written Opinion in PCT/US2017/020775, dated May 24, 2017, 14 pages.
PCT International Search Report and Written Opinion in PCT/US2017/020779, dated May 24, 2017, 14 pages.
PCT International Search Report and Written Opinion in PCT/US2017/020786, dated May 24, 2017, 15 pages.
U.S. Appl. No. 15/253,790, Office Action dated Jun. 29, 2017, 15 pages.
U.S. Appl. No. 15/253,799, Office Action dated Jun. 29, 2017, 15 pages.
PCT International Search Report and Written Opinion in PCT/US2017/020790, dated Sep. 6, 2017, 15 pages.
U.S. Appl. No. 15/253,790, Amendment and Response filed Oct. 31, 2017, 12 pages.
U.S. Appl. No. 15/253,790, Notice of Allowance dated Nov. 27, 2017, 8 pages.
U.S. Appl. No. 15/253,799, Amendment and Response filed Nov. 29, 2017, 12 pages.
U.S. Appl. No. 15/253,763, Office Action dated Mar. 1, 2018, 14 pages.
U.S. Appl. No. 15/253,799, Notice of Allowance dated Feb. 9, 2018, 9 pages.
U.S. Appl. No. 15/253,799, Notice of Allowance dated Feb. 28, 2018, 6 pages.
PCT International Preliminary Report on Patentaibility in PCT/US2017/020786, dated Jul. 10, 2018, 10 pages.
PCT International Preliminary Report on Patentaibility in PCT/US2017/020790, dated Jul. 10, 2018, 11 pages.
PCT International Preliminary Report on Patentaibility in PCT/US2017/020762, dated Jul. 10, 2018, 12 pages.

(56) References Cited

OTHER PUBLICATIONS

PCT International Preliminary Report on Patentaibility in PCT/US2017/020771, dated Jul. 10, 2018, 12 pages.
PCT International Preliminary Report on Patentaibility in PCT/US2017/020775, dated Jul. 10, 2018, 11 pages.
PCT International Preliminary Report on Patentaibility in PCT/US2017/020779, dated Jul. 10, 2018, 10 pages.
U.S. Appl. No. 15/253,763, Office Action dated Jul. 23, 2018, 14 pages.
U.S. Appl. No. 15/253,797, Office Action dated Nov. 26, 2018, 13 pages.
U.S. Appl. No. 15/253,763, Amendment and Response filed Jan. 23, 2019, 18 pages.
U.S. Appl. No. 15/253,763, Office Action dated Feb. 11, 2019, 16 pages.

* cited by examiner

MODULAR SENSING DEVICE FOR CONTROLLING A SELF-PROPELLED DEVICE

CROSS REFERENCE TO RELATED APPLICATION

This application claims the benefit of priority to U.S. Provisional Patent Application Ser. No. 62/274,514, entitled "PORTABLE SENSING DEVICE FOR PROCESSING GESTURES AS INPUT," and filed on Jan. 4, 2016; and U.S. Provisional Application Ser. No. 62/346,216, entitled "MODULAR SENSING DEVICE FOR PROCESSING GESTURES AS INPUT," and filed on Jun. 6, 2016; the aforementioned priority applications being hereby incorporated by reference in their respective entireties.

BACKGROUND

Remotely operated self-propelled devices are typically operable by way of analog or digital controller devices that communicate a limited amount of preconfigured commands. Such commands typically involve signaled radio frequency communications to accelerate and maneuver the self-propelled device. Furthermore, wearable device technology in consumer electronics is rapidly being integrated into routine user activities, such as sporting activities, content viewing or browsing, and task-oriented activities (e.g., gaming).

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

Figure 1A:
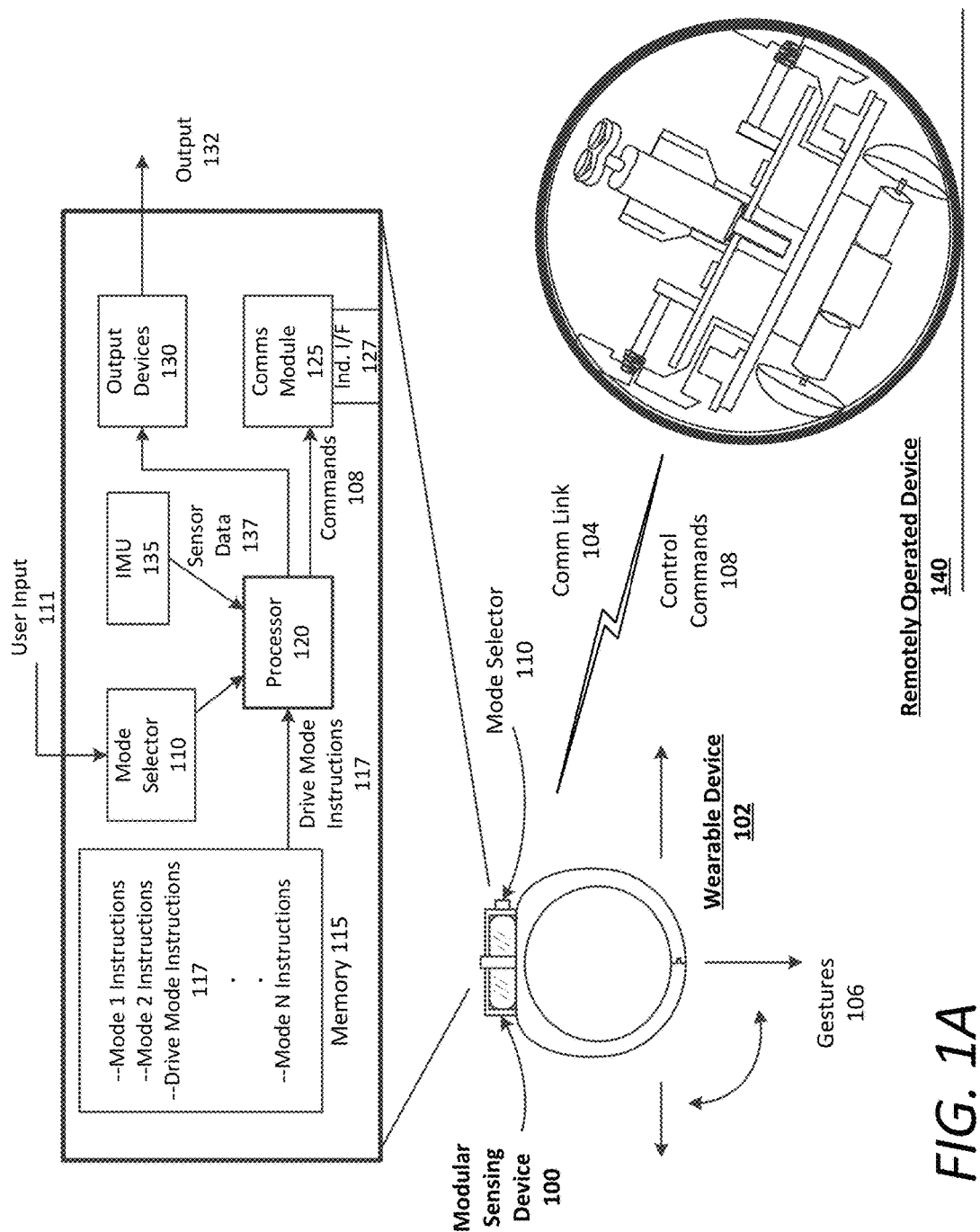
FIG. 1A illustrates a block diagram of an example modular sensing device for use in controlling a remotely operated device, according to examples described herein.

Examples described herein relate to a multi-modal portable sensing device, worn or carried by a user (e.g., as a wrist-worn device), to enable a variety of interactions with other devices through sense movement of the portable sensing device. Among other activities, examples provide for a portable sensing device that can individually, or in combination with another device (e.g., controller device, such as a mobile computing device) control other devices, interact with compatible devices of other users, and/or operate in connection with task-oriented activities (e.g., gameplay). In some examples, the portable sensing device corresponds to a wearable (e.g., a watch, pendant for a necklace, a hat, glasses) that can be placed in a mode to control the characteristics of movement of another device. For example, the portable sensing device can control acceleration and maneuvering of a self-propelled device.

In certain aspects, a wearable device can be operated in connection with a separate mobile computing device that can execute a designated application in order to enable the wearable device to operate in a specified mode. According to some examples, the mobile computing device can be utilized to connect an example wearable device to a smart home device, a self-propelled device, and/or one or more additional wearable devices for purpose of enabling the user to interact with, control, and/or operate such connected devices via user gestures or "body part" gestures (e.g., arm gestures) that can be sensed through the wearable device. Still further, in variations and other applications and implementations, a wearable device can be operable to detect and acquire virtual resources to be utilized by the user in a virtual or network-based environment (e.g., an online gameplay environment).

According to some examples, a portable sensing device is operable to detect its own movement in three-dimensional space using an inertial measurement unit (IMU). In some implementations, the IMU can be an integrated device. Alternatively, the IMU can be implemented through a combination of sensors, such as a three-dimensional accelerometer or gyroscope. In some examples, the portable sensing device can include a processor and memory to interpret the sensor data, and to communicate interpreted sensor data to another device (e.g., mobile computing device) using a wireless connection (e.g., BLUETOOTH). In variations, the IMU can generate raw sensor data based on the user gestures, which can be processed, based on the processing resources of the portable sensing device, and the processing load which is implemented for the portable device.

As used herein, "a portable sensing device" or "modular sensing device" can include any electronic device that includes sensor resources for detecting its own movement, and of dimension and form factor suitable for being carried with one hand or worn on a human body. Numerous examples of portable sending devices are provided in the context of a "wearable device," such as a wrist worn device (e.g., watch, watch band, bracelet). But as noted by other examples, variations to the type and form factor of a wearable device can vary significantly, encompassing, for example, eyeglasses, hats, pendants, armbands, glasses and various other form factors. While many examples described functionality in the context of a wearable device, embodiments extend such examples to other forms of portable sensing devices, such as wands, fobs, or mobile communication devices.

In many examples, the wearable device can include one or more sensors to detect the device's own movements. In particular, a wearable device can include an accelerometer and/or a gyroscopic sensor. In some examples, sensor data, corresponding to gestures performed by the user wearing the wearable device, can be translated into control commands or data packets to be transmitted and implemented based on the selected mode of the wearable device. According to many examples, the wearable device can include an inductive interface to inductively pair with other devices, which can trigger a specified mode on the wearable device. For example, an inductive pairing between the wearable device and a self-propelled device can trigger a "drive mode" in which the wearable device can be utilized by the user to operate the self-propelled device. Additionally or alternatively, the wearable device can include an input mechanism, such as an analog or digital button, that enables the user to select a particular mode and/or scroll through a series of modes for the wearable device.

Among other functionality, some examples described herein provide for alternative modes of operation for the portable sensing device, including, for example, aspects of a drive mode in which the portable sensing device is utilized to control a self-propelled device. One aspect of the drive mode includes a palm control illusion in which a user wears a wrist-worn device having the portable sensing device inserted therein, and performs arm gestures to control the self-propelled device. In interpreting the sensor data, the portable sensing device can establish sensor data boundaries in which directional commands are changed. For example, as the user lifts an arm beyond a certain threshold angle (e.g., fifty degrees), the portable sensing device can be triggered to alter sensor data interpretation (e.g., reverse the forward acceleration command and/or the directional turning commands). Thus, as the user raises or lowers an arm across such thresholds, the portable sensing device can trigger a sub-modal change within the drive mode, such that an illusion of an invisible force control of the self-propelled device is perceived. This palm control illusion may comprise triggered execution of sub-mode instructions within the drive mode, or can be instigated through state machine triggers, as described herein.

Still further, numerous examples make reference to a "self-propelled" device. A self-propelled device can include, for example, a device that can be wirelessly and remotely controlled in its movement, whether the movement is on ground, water, or air. For example, a self-propelled device can include a wirelessly and remotely controlled drone, car, plane, helicopter, boat, etc. While conventional examples enable control of a self-propelled device, conventional approaches generally utilize a perspective of the device being controlled. While some conventional devices, for example, enable a computing device held by the user to project a perspective of the device under control, examples described herein enable control of such devices to utilize an orientation of the user. Specifically, some examples include a portable sensing device that can determine an orientation of the user, and further enable control of the self-propelled device through an environment that accommodates or is in the perspective of the user, based on the orientation of the user (as determined by the portable sensing device). By way of example, the control of a self-propelled device can be projected through an orientation or perspective of the user for purpose of a virtual environment.

Some examples include a wearable device having a wireless communication module (e.g., a BLUETOOTH low energy module) that enables communication of sensor data (e.g., raw sensor data from the accelerometer or gyroscopic sensor), or translated data (i.e., translations of the sensor data based on the selected mode of the wearable device). In some examples, the sensor data may be relayed for translation by a mobile computing device before being transmitted to another device (e.g., a paired wearable device or a paired self-propelled device). In other examples, processing resources of the wearable device can execute mode instructions, based on the selected mode, to translate the sensor data for direct transmission to one or more other devices, as described herein.

As used herein, "body part gestures" or "user gestures" include gestures performed by a user while utilizing the wearable device. For example, the wearable device may be a wrist-worn device, in which case the body part or user gestures may comprise arm gesture, and can include any number of physical movements or actions that affect the sensors of the wearable device when it is worn on the wrist. Such movements and actions can include shaking, arm movements (e.g., raising, lowering, pointing, twisting, and any combination thereof), wrist movements, hand actions (such as grasping or grabbing), and the like. However, the wearable device is not limited to wrist-worn devices, but may be utilized as a ring (e.g., a finger-worn device), an ankle-worn device, a neck-worn device, a head-worn device, a belt (e.g., a waist-worn device), etc. Thus, user gestures performed using the wearable device can be any actions or movements in which correlated sensor data from sensors of the device can be translated into commands, instructions, feedback, etc. depending on the mode of the wearable device.

Among other benefits, examples described herein achieve a technical effect of enhancing user interactivity with other devices and other users. Such interactivity may include utilizing the wearable device to control a self-propelled device, interact with other users of wearable devices, collect and share data, control smart home devices, and the like.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules or components of a system. A programmatic module or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein can be implemented, in whole or in part, on computing devices such as digital cameras, digital camcorders, desktop computers, cellular or smart phones, personal digital assistants (PDAs), virtual reality (VR), augmented reality (AR), or mixed reality (MR) headsets, laptop computers, printers, digital picture frames, and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples can be carried and/or executed. In particular, the numerous machines shown with examples include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smart phones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a non-transitory computer usable carrier medium capable of carrying such a program.

System Description

FIG. 1A illustrates a block diagram of an example modular sensing device for use in controlling a remotely operated device, according to examples described herein. The modular sensing device 100 shown in FIG. 1A may be integrated with a wearable device 102 (e.g., a wrist-worn device, pendant, clothing, a hat, eyeglasses, an ankle-worn device, a ring, etc.), or can be inserted into a compartment or otherwise included as a part of the wearable device 102. The wearable device 102, or modular sensing device 100 disposed therein, can include a mode selector 110, such as an analog button that enables the user to select a mode of the device. In one example, repeated input 111 on the mode selector 110 enables the user to scroll through a list of available modes. Such modes include, but are not limited to a drive mode, a control mode, a finder mode, a mining mode, a training mode, a sword mode, a default mode, an interactive or battle mode, a sharing mode, and a gaming mode. As shown in the block diagram, a user input 111 on the mode selector 110 can cause a processor 120 of the modular sensing device 100 to generate an output 132 that indicates the particular mode selected. For example, the modular sensing device 100 can include a number of output devices 130, such as an audio device, a haptic system, and/or visual elements (e.g., an LED array or display). Each user input 111 on the mode selector 110 can trigger an audio, haptic, and/or visual output 132, indicating the particular mode (e.g., a drive mode). As an example, the output 132 can comprise a voice output that states the selected mode, or a combination of voice, visual, and haptic output.

Additionally or alternatively, the user may connect the wearable device 102 with a mobile computing device, such as the user's smart phone or tablet computer. Mode selection may be performed automatically by the user initiating a designated application of the mobile computing device, such as a smart home application, a controller application (e.g., to control a self-propelled device), a gaming application, and the like. In variations, the user can execute a designated application in connection with the wearable device 102 that enables the user to scroll through the various modes. The user may scroll through the modes on the mobile computing device, or via successive selection inputs on the mode selector 110, which can trigger the mobile computing device to display a selectable mode. In other variations, multiple types of inputs can be performed in the mode selector 110, such as tap gestures and tap and hold gestures, which can correlate to scrolling through the modes and selecting a particular mode respectively. As provided herein, the mode selector 110 can be an input mechanism such as an analog or digital button, a touch panel such as a track pad, or a miniature touch-sensitive display device.

According to examples provided herein, the modular sensing device 100 can include a memory 115 that stores mode instruction sets executable by the processor 120 based on the mode selected by the user. Each mode instruction set can cause the processor 120 to interpret sensor data 137 in a particular manner. Along these lines, same or similar gestures 106 performed by the user can result in different generated outputs 132 or commands 108 depending on the mode selected by the user. In some implementations, selection of a particular mode can cause the processor 120 to initiate a communications module 125 of the modular sensing device 100 to establish a wireless connection with another device. In one example, the modular sensing device 100 can include a BLUETOOTH low energy module to enable communications with one or more other devices, such as a second modular sensing device or a remotely operated device 140.

The modular sensing device 100 can be relatively small in size compared to current computing devices, and in many implementations, the modular sensing device 100 does not include a power-intensive memory and computational resources. In such implementations, the memory and/or memory controller can be comprised of or implement a series of state machines that, when transitioned, can trigger a particular output automatically. Further description of the state machine implementations is provided below with respect to FIG. 1B. Furthermore, examples described herein with respect to the drive mode of the modular sensing device 100 can also be implemented in the state machine examples described herein.

As provided herein, the memory 115 can include a drive mode instruction set 117 executable by the processor 120 in response to a user input 111 on the mode selector 110. In some aspects, execution of the drive mode instructions 117 can cause the processor 120 to initiate the communications module 125 to establish a communications link 104 with a proximate remotely operated device 140. In variations, the modular sensing device 100 can include an induction interface 127 which can trigger the communication link 104 between the modular sensing device 100 and the remotely operated device 140. For example, upon selecting the drive mode, the user can place the wearable device 102 within inductive range (e.g., ~2-5 cm) of the remotely operated device 140, which can include a corresponding induction interface. The inductive transfer of communication information can enable the modular sensing device 100 to establish the communication link accordingly.

According to examples described, the modular sensing device 100 can further include an inertial measurement unit (IMU) 135 that can comprise a gyroscope and an accelerometer for accurate measurement of the modular sensing device's 100 movement and orientation. In variations, the IMU 135 can further include a magnetometer to, for example, assist in calibration based on the orientation. Once the communication link 104 is established in the drive mode, the processor 120 can monitor the sensor data 137 for the particular gestures 106 being performed by the user. In several examples, the gestures 106 can correspond to the user raising or lowering an arm, and/or performing additional arm motions. The sensor data 137 from the IMU 135 can comprise movement, position, and/or orientation information that the processor 120 can interpret in accordance with the drive mode. For example, gestures 106 performed by the user can be detected by the processor 120 via sensor data 137 from the IMU 135. Each of the gestures 106 can be interpreted by the processor 120 as one or more control commands 108 to be executed by the remotely operated device 140.

In one example, the drive mode can be automatically initiated in response to a particular detected gesture, regardless of the current mode of the modular sensing device 100. This gesture can correspond to a distinct sensor data signature that, when detected by the processor 120 in executing any mode, overrides that mode and initiates the drive mode automatically. Thus, upon detection of the distinct sensor data signature, the processor 120 can automatically initiate the communications module 125, establish the communications link 104 with the remotely operated device 140, and generate control commands 108 based on the detected gestures 106 performed by the user in the sensor data 137. The modular sensing device 100 may then dynamically transmit such control commands 108 to the remotely operated device 108 for execution as they are generated by the processor 120. In one example, the specific gesture corresponds to a pushing motion with an arm wearing the wearable device 102 performed by the user. As provided herein, this pushing motion can correspond to a specified sensor data signature not used for any other mode, and is therefore distinct to enable the processor 120 to identify it irrespective of the current mode of the modular sensing device 100.

In certain examples, gestures 106 such as raising an arm can cause the processor 120 to generate acceleration commands to drive away from the user. Lowering the arm can cause the processor to generate deceleration and/or reverse commands. Further, moving the arm from side to side can cause the processor 120 to generate steering or directional commands. For example, moving the arm left can cause the remotely operated device 140 to turn left, and moving the arm right can cause the device 140 to turn right as the device 140 travels away from the user. Such control commands 108 may be processed by a controller of the remotely operated device 140, or may be directly executed on the drive motors of the device 140 in order to accelerate and maneuver the device 140 in accordance with the gestures 106 performed by the user.

Furthermore, in the drive mode, angular thresholds can be established in the drive mode instructions 117 that can determine the manner in which the processor 120 interprets the sensor data 137. When such thresholds are crossed, the processor 120 can alter interpretation of the sensor data 137 into alternative commands 108. For example, as the user raises the arm above an angular threshold (e.g., 45 degrees), and/or changes an orientation of the arm (e.g., palm down to palm up), the processor 120 can alter the interpretation of the sensor data 137 such that remotely operated device 140 drives towards the user as the arm is raised. Furthermore, in such a state, the directional interpretation of the sensor data 137 can be reversed such that moving the arm left can cause the remotely operated device 140 to turn right, and moving the arm right can cause the remotely operated device 140 to turn left. This directional reversal triggered by the angular threshold, and in combination with the change in orientation of the user's arm, can create a palm control illusion of the remotely operated device 140 by the user. Thus, in the drive mode, specified gestures detected in the sensor data 137 (e.g., the user's arm rotating or crossing an angular threshold) can trigger the processor 120 to interpret the sensor data 137 differently, or inversely from an initial interpretation, in order to produce the illusion. Further description of the palm control illusion is provided below in connection with FIGS. 5 and 6.

Figure 1B:
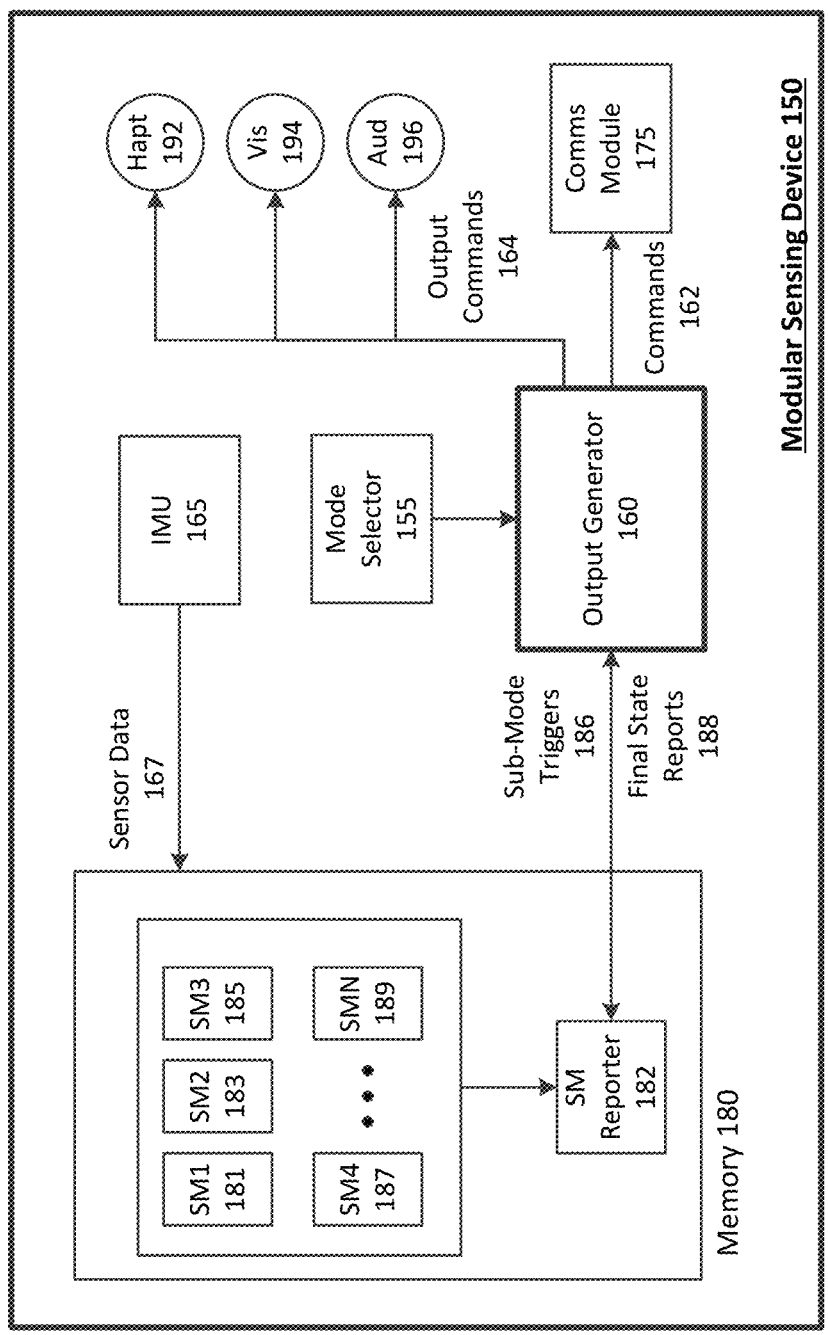
FIG. 1B is a block diagram illustrating an example modular sensing device, as shown and described herein.

FIG. 1B is a block diagram illustrating an example modular sensing device, as shown and described herein. As provided herein, the modular sensing device 150 can be space limited, and can only include a limited amount memory and computational resources. In such implementations, the modular sensing device 150 can represent each possible gesture that can be performed by a user as a state machine. Thus, for each gesture, a state machine corresponding to that gesture can either positively identify its gesture or negatively identify its gesture. When a positive gesture is identified, the state machine triggers a state transition which can cause an output generator 160 to generate a particular output accordingly. As provided herein, the output generator 160 and memory 180 can comprise a hardware controller implementing the various state machines to generate the output commands 164.

As an illustration, the modular sensing device 150 can include a memory 180 implementing a number of state machines (e.g., SM1 181, SM2 183, SM3 185, SM4 187, . . . , SMN 189), each being associated with a particular gesture. For example, SM1 181 can be associated with the user raising an arm, SM2 183 can be associated with the user lowering an arm, SM3 185 can be associated with the user pointing an arm to the right, and SM4 187 can be associated with the user pointing an arm to the left. Furthermore, any number of state machines may be implemented in the memory 210 representing any number of gestures. At any given time step, the state machines can be instantiated for each gesture type, and each state machine can continuously inspect the instantaneous sensor data 167 from the IMU 165 in order to initialize or instantiate, transition individual states along a state string, terminate a current state string, or trigger an accept state or final state. When the final state is triggered, this means that the particular gesture corresponding to that state machine has been performed by the user.

According to examples, each state machine can consist of a finite set of states (a fixed string of states), one or more inputs, one or more outputs, a transition function, and an initial state. The state machine can be linked to a particular gesture by way of a sensor data signature, which can comprise an accelerometer data signature, gyroscope data signature, or a combination of both. Furthermore, the state machine can be linear and directional, with each state having a particular error tolerance in its sensor data signature. A final state of a state machine can thus be triggered when the full sensor data signature of a particular gesture is matched to the sensor data 167 generated by the IMU 165.

In some aspects, if at any time after instantiating, an associated gesture corresponding to a respective state machine is not being performed, the input string for that state machine, and for that particular instantiation, automatically terminates. At any given instance, the state machine either terminates from the outset (e.g., an initial aspect of the sensor data signature for the gesture is not matched), or instantiates the input string towards the final state. At any given state along the input string, the state machine can terminate if the gesture being performed diverges from the error tolerances built into the state machine. If, however, each state along the input string is transitioned accordingly (i.e., the sensor data 167 from the IMU 165 matches the sensor data signature for that state machine within its error tolerances), the final state is triggered for that state machine.

The memory 180 can include a state machine reporter 182 that can report such final state transitions 188 to an output generator 160 of the modular sensing device 150. The output generator 160 can be configured based on the particular mode of the modular sensing device 150. Accordingly, final state reports 188 from individual state machines can be interpreted differently, or can cause a particular output, depending on the mode. In other words, the output from the modular sensing device 150 for a particular gesture (e.g., a backhanded swinging motion) can be different depending on the mode initiated via the mode selector 155. Furthermore, certain final state reports 188 from the state machine reporter 182 can correspond to sub-mode triggers 186 for the particular mode. Such sub-mode triggers 186 may not trigger an output, but rather trigger the output generator 160 to alter interpretation of certain final state reports 188 in order to generate an alternative output.

Such outputs generated by the output generator 160 can comprise control commands 162 to operate a remotely operated device, such as acceleration, steering, and deceleration commands. In some aspects, the output generator 160 can generate output commands 164 for the modular sensing device's 150 haptic system 192, visual system 194, and/or audio system 196. Thus, as final state reports 188 are received, the output generator 160 can cause the haptic 192, visual 194, and audio 196 systems of the modular sensing device 150 to produce individual or combined outputs. As described herein, such outputs can include vibration feedback or guidance, colored lights or display output, tonal outputs such as audible chimes that indicate positive and/or negative feedback, and voice output.

In the example of the drive mode described with respect to FIG. 1A, each completed arm gesture can correspond to a final state machine report 188, and can cause the output generator 160 to generate a control command 162 accordingly. In the example shown in FIG. 1B, the user raising an arm above a certain angle (e.g., five degrees) can cause a state machine corresponding to that gesture to transition to a final state. The state machine reporter 182 can report the final state 188 of that state machine to the output generator 160, which, based on the drive mode interpretation, can generate a control command 162 to initiate acceleration of the remotely operated device. This control command 162 may then be transmitted to the remotely operated device via the communications module 175 of the modular sensing device 150.

Referring to both FIGS. 1A and 1B, in certain modes, the communications module 125, 175 can act as a signal or beacon sensor which can provide signal data to the processor 120 or output generator 160. Based on the mode, the processor 120 or output generator 160 can generate a specified response based on the signal data. For example, the signal data can indicate a unique identifier of the signal source. The memory 115, 180 can include a UID log of specified signal sources that allow the user to interact with such sources based on the mode of the modular sensing device 100, 150. For example, if the signal source corresponds to another modular sensing device, the user can be enabled to select a mode in which the user can interact with the other user (e.g., play a physical game involving gestures).

As described with respect to FIG. 1A, the interpretation of the sensor data 137 can be altered based on a particular gesture trigger, such as the user's arm exceeding an angular threshold. The analog with respect to FIG. 1B comprises a state machine in the memory 180 that correlates to the particular threshold gesture. Thus, when the sensor data 167 indicates the specified threshold gesture, the correlated state machine can transition to its final state, which can be reported to the output generator 160 accordingly. Such a final state report 188 can comprise a sub-mode trigger 186, in that the sub-mode trigger 186 causes the output generator 160 to alter interpretation of certain final state reports 188 while remaining in the same mode. In the drive mode example, a sub-mode trigger 186 can correspond to the user raising an arm above a certain threshold (e.g., 45 degrees), which can cause the output generator 160 to, for example, reverse the interpretation of the final state reports 188 corresponding to the directional commands for the remotely operated device.

Additionally, each mode of the modular sensing device 150 can include any number of sub-mode triggers 186 that cause the output generator 160 to alter an interpretation of or disregard a particular final state report 188 corresponding to a specified sensor data signature. For example, the drive mode can include a set of angular gesture thresholds (e.g., raising an arm beyond 45 degrees, lower the arm below 45 degrees, turning the arm from palm down to palm up). A state machine can be dedicated—within the specified mode—to a sensor data signature indicating the user gesture crossing a gesture threshold. Thus, when the user gesture crosses the gesture threshold, the dedicated state machine can transition to its final state, which, when reported to the output generator 160 (i.e., as a sub-mode trigger 186), can cause the output generator 160 to alter interpretation of certain final state reports 188 within that mode. In some aspects, disregarded final state reports prior to the sub-mode trigger can now trigger a specified output (e.g., an audio, haptic, and/or visual output, or a particular control command 162).

In further examples, when the modular sensing device 150 is in a particular mode, a specific complex gesture—represented by a particular state machine in the memory 180—can cause the output generator 160 to reconfigure its interpretation of certain final state reports 188, execute a sub-mode, or automatically initialize a different mode for the modular sensing device 150. Accordingly, for any given instance, sensor data 167 from the IMU 165 can continuously cause the various state machines to instantiate, terminate, instigate state transitions, and/or transition to a final state. In aspects described, only when a state machine transitions to its final state does the output generator 160 generate output commands 164 and/or control commands 162 to provide feedback, operative control over a remotely operated device, guidance via the output devices, and/or task-based instructions (e.g., in accordance with a particular game).

Figure 2:
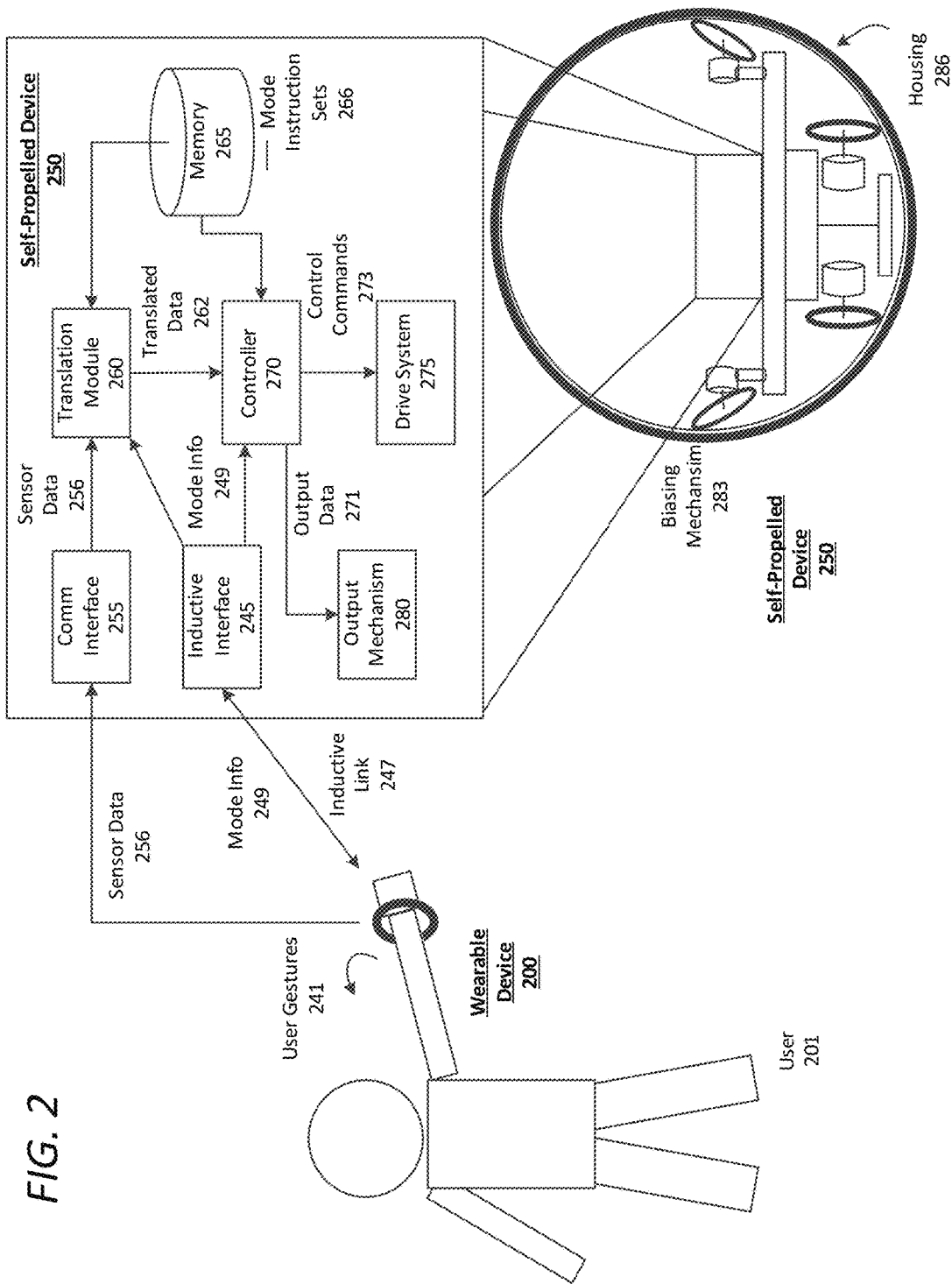
FIG. 2 is a block diagram illustrating an example portable sensing device in communication with a self-propelled device.

Furthermore, the various aspects performed by the modular sensing device 100 described with respect to FIG. 1A may also be performed by example modular sensing devices 150 as shown and described with respect to FIG. 1B. Thus, the execution of designated modal instruction sets by the modular sensing device 100 of FIG. 1A—in which the processor 120 directly interprets the sensor data 137 based on the executing instruction set—may be substituted by the state machine examples as described with respect to FIG. 1B. In other words, the limited memory and computational resources of the modular sensing device 150 of FIG. 1B may be compensated by attributing sensor data signatures to state machines, requiring less memory and processing without sacrificing functionality FIG. 2 is a block diagram illustrating an implementation of a wearable device 200 in communication with a self-propelled device 250, according to some examples described herein. In the example provided, the wearable device 200 is worn on the wrist of a user 201, and the user 201 can perform various user gestures 241 that can cause the sensors of the wearable device 200 to generate sensor data 256. Furthermore, the arrangement shown in FIG. 2 can be implemented in the drive mode and the training mode of the wearable device 200. In the example shown, the wearable device 200 transmits sensor data 256 to a communication interface 255 of the self-propelled device 250. However, various examples are described herein in which sensor data 256 translation is performed by the wearable device 200 executing certain mode instructions 231 for operating the self-propelled device 250 (e.g., in the drive mode), implementing the self-propelled device 250 in the training mode, or otherwise utilizing the self-propelled device 250 in any of the other modes described herein. Furthermore, execution of a particular mode on the wearable device 200 can cause the self-propelled device 250 to execute a correlated mode itself.

In many examples, the translation module 260 and the controller 270 can execute mode instructions 266 to enable the self-propelled device 250 to operate in multiple modes, such as an autonomous mode, a normal control mode, a drive mode, and a training mode. In normal control mode, the self-propelled device 250 can be operated by a mobile computing device executing a control application. Upon executing the control application on the mobile computing device by the user, the controller 270 and the translation module 260 can operate based on user inputs on a graphical user interface (GUI) generated on a display screen of the mobile computing device.

Referring to FIG. 2, the user can further initiate a mode on the wearable device 200 can perform an inductive link 247 between the wearable device 200 and an inductive interface 245 of the self-propelled device 250. The inductive link 247 can provide mode information 249 to a controller 270 and a translation module 260 of the self-propelled device 150 via the inductive interface 245. Accordingly, the controller 270 and translation module 260 can pull the appropriate mode instruction set 266 from a memory 265 of the self-propelled device 250 for execution. In examples described herein, the memory 265 can store multiple mode instruction sets 266 corresponding to multiple operable modes.

Once in a specified mode (e.g., the drive mode), the communication interface 255 of the self-propelled device 250 can receive the sensor data 256, from the wearable device 200, corresponding to user gestures 241 performed by the user 201. The sensor data 256 can be translated by the translation module 260 in accordance with the executed mode instruction set 266. The translated data 262 can be transmitted to the controller 270, which can process the translated data 262 to provide control commands 273 to a drive system 275 of the self-propelled device 250. The controller 270 can further process the translated data 262 to generate output data 271, which can be utilized by an output mechanism 280 (e.g., a speaker set, a lighting system, an external accessory device, etc.), which can generate a corresponding output response (e.g., any combination of audio, visual, or motional gestures, such as an anthropomorphic gesture like a head shake or a head nod using an accessory device described herein).

In various implementations, the internal drive system 275 of the self-propelled device 250 can include a number of wheels that are actively biased against an inner wall of a spherical housing 286 of the self-propelled device 250 by a biasing mechanism 283. The biasing mechanism 283 can include a number of spring elements and/or a number of spring-loaded portal axles that provide a force against the inner surface of the spherical housing 286. The force against the inner surface by the spring element(s) or portal axles, force the drive system 275 against the inner surface of the spherical housing 286 such that when power is applied to the wheels, the spherical housing 286 is caused to roll, and the self-propelled device 250 is caused to accelerate and maneuver.

Figure 3A:
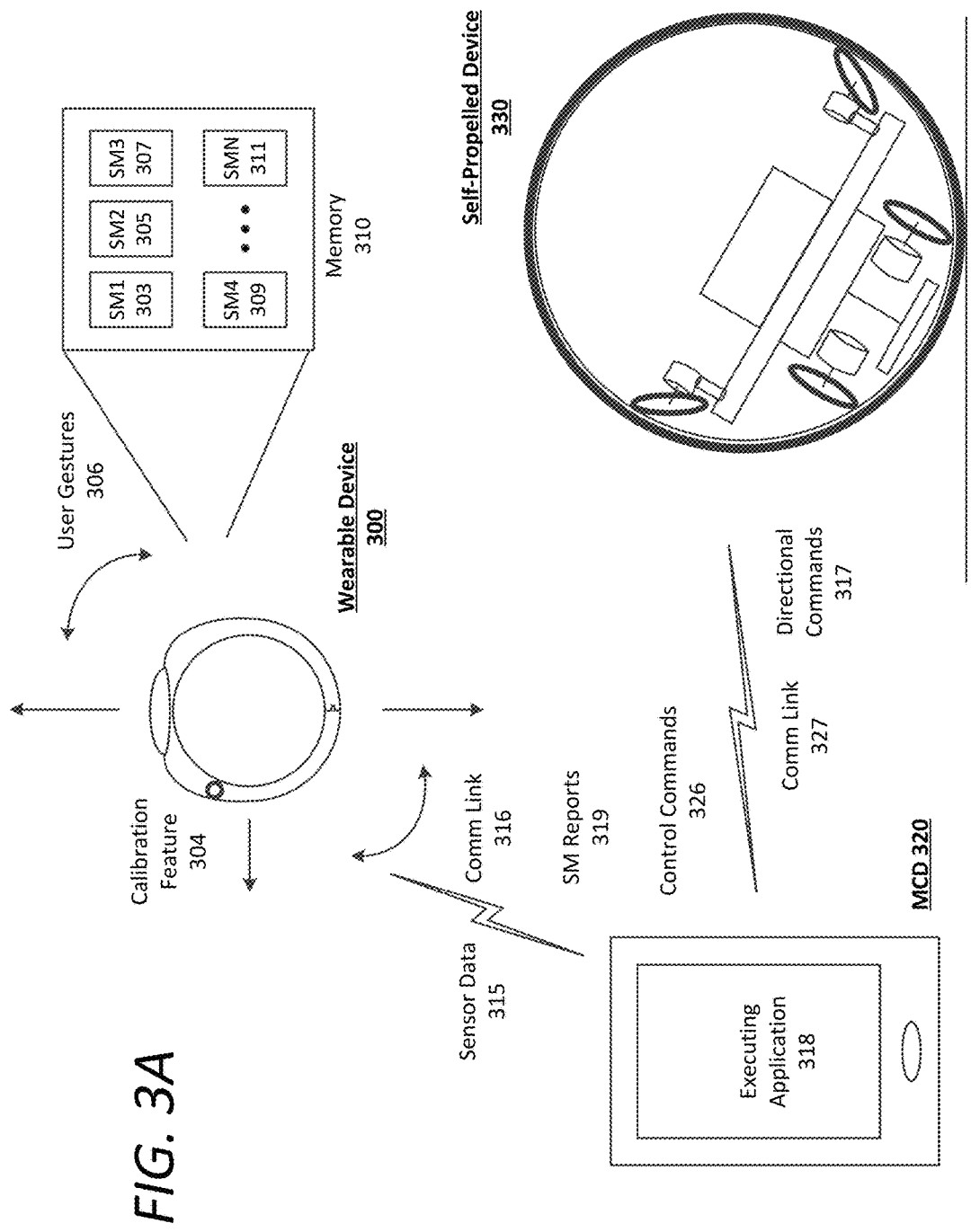
FIG. 3A illustrates an example portable sensing device in communication with a mobile computing device and a self-propelled device.

FIG. 3A illustrates an example portable sensing device (shown as wearable device 300) in communication with a mobile computing device 320 and a self-propelled device 330. In the examples provided in connection with FIG. 3A, a communication link 316 can be established between a mobile computing device 320 and the wearable device 300. The communication link 316 can be established upon the user executing a control application 318 on the mobile computing device 320, or upon a user input on the wearable device 300. The communication link 316 can be a short range wireless link, such as a Classic BLUETOOTH or BLUETOOTH low energy link. Furthermore, the mobile computing device 320 can establish a communication link 327 with the self-propelled device 330. In some examples, this communication link 327 can be established according to the same protocol as the communication link 316 between the wearable device 300 and the mobile computing device 320. In such examples, the wearable device 300, the mobile computing device 320 and the self-propelled device 330 can all be wirelessly coupled in a single piconet within the short communication range of the wireless protocol (e.g., BLUETOOTH low energy).

In many examples, the user of the wearable device 300 can perform an initial calibration to indicate a forward direction of the self-propelled device 330. This initial calibration can include a user input on a calibration feature 304 of the wearable device 300. The calibration feature 304 can be any type of input mechanism, such as an analog button or a touch-sensitive panel. According to examples described herein, the calibration feature 304 can be the same as the mode selector 110 described with respect to FIG. 1A. The calibration can be performed manually by the user, or can be automated. Manual calibration can involve the user positioning the self-propelled device 330 such that the forward direction of the self-propelled device 330 is pointing away from the user. The user may then provide an input on the calibration feature 304 when the wearable device 300 is forward directionally aligned with the self-propelled device 330. Upon providing the input on the calibration feature 304, a calibration signal can be generated by the wearable device 300 and transmitted to the self-propelled device 330 to indicate the forward direction. Upon receiving the calibration signal, the self-propelled device 330 can adjust a forward operational direction of the internal drive system to be aligned with the wearable device 300.

Automated calibration can involve an exploitation of an asymmetry in a radiation pattern of a wireless signal, such as a BLUETOOTH low energy signal, generated by the self-propelled device 330. In certain implementations, the user can provide an input on the calibration feature 304, which can generate an automatic spin command for transmission to the self-propelled device 330. The spin command can be transmitted directly to the self-propelled device 330, or can be relayed through the mobile computing device 320. The control system of the self-propelled device 350 can execute the spin command on to initiate a calibration spin. Variations in the communication signal due to the asymmetry in the radiation pattern can be detected by the mobile computing device 320 and/or the wearable device 300. The signal variation may also be detected by the self-propelled device 330 to identify the directional relationship between the user and the self-propelled device 330, and calibrate the forward directional alignment. Additionally or alternatively, the mobile computing device 320 or the wearable device 300 can transmit a directional command 317 to the self-propelled device 330 to cause the self-propelled device 330 to rotationally maneuver to be in forward alignment with the wearable device 300.

Manual or automated directional calibration and/or gyro alignment can lock both the self-propelled device's 330 initial coordinate system and the wearable device's 300 initial coordinate system to Earth's inertial reference frame, which can readily indicate the spatial relationship between the wearable device 300 and the self-propelled device 330 at any given time. Locking coordinate systems can further indicate the spatial and orientation relationship between the internal drive system of the self-propelled device 330 and the wearable device 300 at any given time during operation. As such, the sensors (e.g., gyroscopic sensors and/or accelerometers) of the wearable device 300 and the internal drive system can be initially calibrated with respect to the Earth and each other in either the manual calibration (e.g., an aiming routine) or automated calibration.

Calibration may further be assisted, and the user provided with feedback, via the wearable device's 300 feedback system in conjunction with a calibration indicator on the self-propelled device 330. In many aspects, the internal drive system of the self-propelled device 330 can include an internal LED indicating a rearward direction so as to be viewable by the user. To provide added feedback concerning calibration, the wearable device 300 can provide a combination of audio, visual, and/or haptic feedback indicating successful or unsuccessful alignment. Furthermore, if collisions are detected on the self-propelled device 330, the wearable device 300 can provide feedback (e.g., haptic feedback for each collision), and an indication of whether the initial calibration has been affected beyond predetermined tolerances or thresholds. If the alignment has been affected, the wearable device 300 can initiate realignment feedback instructing the user to "re-aim" or recalibrate the directional alignment (e.g., a red light and audio instructions).

Once calibrated, the user wearing the wearable device 300 can perform user gestures 306, and sensor data 315 corresponding to those gestures 306 can be streamed to the mobile computing device 320 over the communication link 316. The executing control application 318 on the computing device 320 can cause processing resources of the computing device 320 to translate the sensor data 315 into control commands 326, which can be transmitted to the self-propelled device 350 over the communication link 327. The control commands 326 can be received by the control system 354 of the self-propelled device 350 and implemented on the drive system 352, as described herein.

The user gestures 306 may be any movements or actions performed by the user using the wearable device 300. For example, if the wearable device 300 is a wrist-worn device, the user can perform arm actions to control movement of the self-propelled device 350. In certain implementations, the arm actions can include the user raising or lowering an arm wearing the wrist-worn device, rotating the arm, moving the arm from side-to-side, and various combinations of movements and gestures. Each of these actions can include a specific sensor profile, which can be detected by the mobile computing device 320. Accordingly, the mobile computing device 320 can receive sensor data 315 corresponding to the user actions, where each of the actions may be identifiable in the sensor data 315 as individual sensor patterns in the data 315.

The translation performed by the mobile computing device 320 can be based on an identification of each sensor pattern and a correlated translation into a specified control command. For example, when the user raises the arm, an accelerometer and/or gyroscopic sensor in the wrist-worn device can output the corresponding data 315 to the mobile computing device 320. The data 315 can indicate the arm raising motion, and the executing control application 318 can translate the data 315 into a control command 326 to accelerate the self-propelled device 350 forward. When the user's arm is lowered, the corresponding control command 326 can cause the self-propelled device 350 to brake or otherwise decelerate.

In some examples, mobile computing device 320 can include a database mapping sensor patterns to individual control commands 326, such that when a sensor pattern is detected in the sensor data 315, the mobile computing device 320 can immediately identify a correlated control command 326 and transmit the control command 326 to the self-propelled device 330 for implementation. Accordingly, sensor data 315, corresponding to the user gestures 306 performed by the user, can be processed into control commands 326 by the mobile computing 320, which may then be transmitted to the self-propelled device 330 for implementation.

In certain implementations, the wearable device 300 can be space limited, and only include a limited amount memory and computational resources. In such implementations, the wearable device 300 can represent each gesture that can be performed by a user as a state machine. Thus, for each gesture, a state machine corresponding to that gesture can either positively identify its gesture or negatively identify its gesture. When a positive gesture is identified, the state machine corresponding to that gesture can report the positive identification to the mobile computing device 320 or the self-propelled device 330, which can executed a control command 326 based on the gesture associated with the state machine.

As an illustration, the wearable device 300 can include a memory 310 and/or controller implementing a number of state machines (e.g., SM1 303, SM2 305, SM3 307, SM4 309, . . . , SMN 311), each being associated with a particular gesture. For example, SM1 303 can be associated with the user raising an arm, SM2 305 can be associated with the user lower an arm, SM3 307 can be associated with the user pointing an arm to the right, and SM4 309 can be associated with the user pointing an arm to the left. Furthermore, any number of state machines may be implemented in the memory 310 representing any number of gestures. At any given time step, the state machines can be instantiated for each gesture type, and each state machine can inspect the instantaneous sensor data to determine whether to update its state. If at any time after instantiating, a respective state machine determines that its associated gesture is not being performed, it can request destruction, immediately releasing its memory resources, until the gesture is complete, and/or the state machine can reinstantiate accordingly. If, however, the state machine determines that its associated gesture has been completed, the state machine reports the event (i.e., its state change) to the mobile computing device 320 or the self-propelled device 330 and releases its memory resources and/or reinstantiates.

As an example, state machine (n) (SMN 311) can be associated with a gesture that causes the self-propelled device 330 to turn left. The associated gesture may be the user having an arm raised and pointing left, and can have a correlated sensor pattern that, if detected by SMN 311, cause the state of SMN 311 to change—which, in turn, causes SMN 311 to report the state change in a state machine report 319 to the mobile computing device 320 or the self-propelled device 330. The state machine report 319 can ultimately cause the self-propelled device 330 to execute the control command 326 associated with the gesture—in this case, turn left.

As provided herein, the memory 310 of the wearable device 300 can comprise any number of state machines that transition states when their associated gestures are identified in the sensor data. For each gesture performed by the user, each of the state machines in the memory 310 can monitor the sensor data for its associated sensor pattern. The wearable device 300 arrangement shown in FIG. 3A can be utilized for any of the modes discussed herein. Furthermore, the wearable device 300, including the state machine embodiment, can operate in conjunction with an executing application 318 on a connected mobile computing device 320. The mobile computing device 320 can receive each state machine report 319 indicating the gestures performed by the user wearing the wearable device 300, and generate a corresponding instruction or command depending on the mode, as described herein.

In the example shown in FIG. 3A, the mobile computing device 320, executing a designated application 318, can identify the mode of the wearable device 300. The mode can determine the manner in which the mobile computing device 300 translates each state machine report received, and the corresponding response.

In variations, one or more examples described herein provide for the wearable device 300 itself to handle the state machine reports 319, execute feedback based on the reports, and/or transmit data (e.g., control commands 326 to the self-propelled device 330) corresponding to each state machine report 319 in accordance with the selected mode.

Figure 3B:
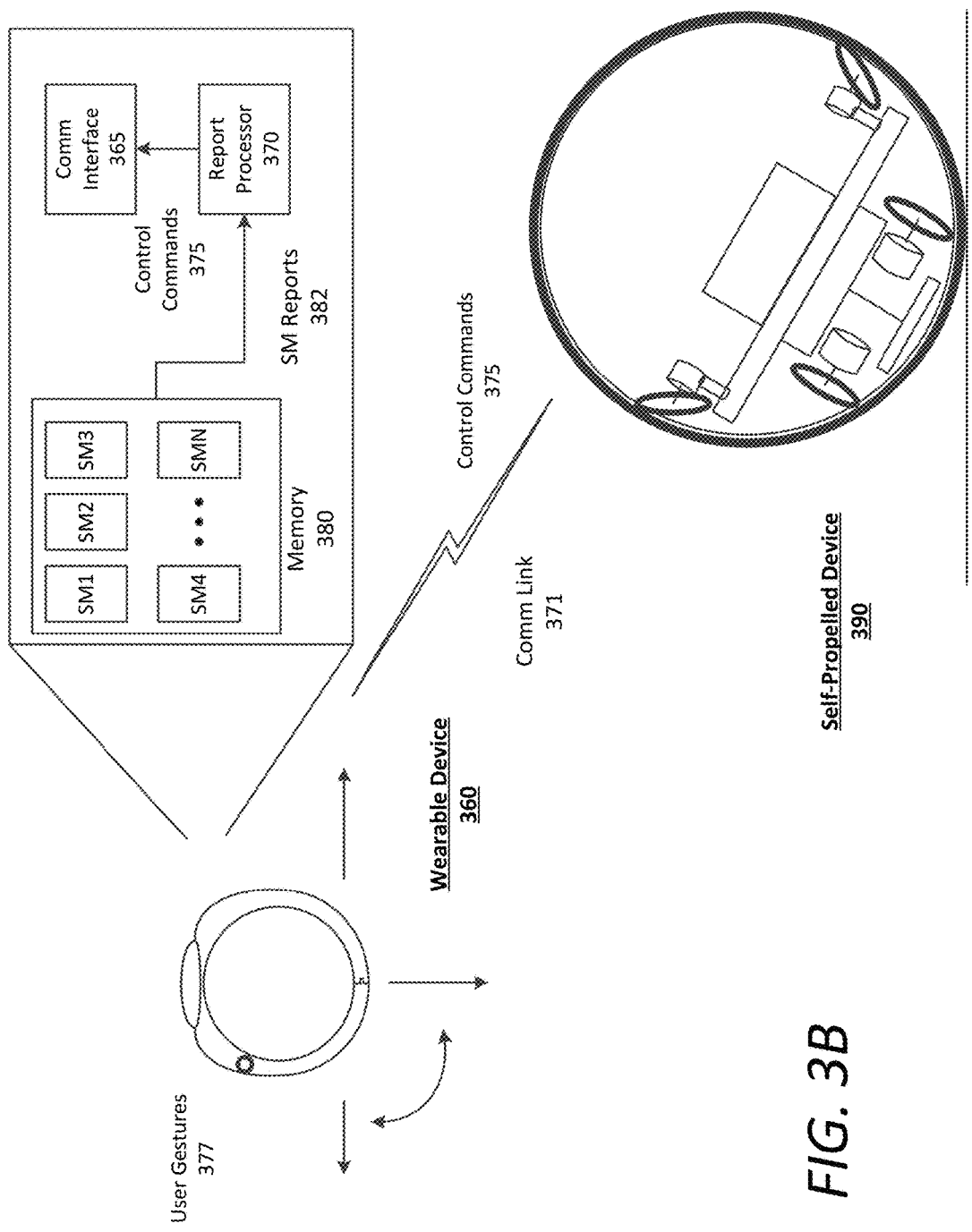
FIG. 3B illustrates an example portable sensing device for generating commands for execution on a self-propelled device.

FIG. 3B illustrates an example portable sensing device for generating commands for execution on a self-propelled device. More specifically, in an example provided in connection with FIG. 3B, a wearable device 360 is a wrist-worn device that includes a memory 380 comprising a number of state machines, as described with respect to FIG. 3A. The wearable computing device 360 can include a report processor 370 programmed to process state machine reports 382. In, for example, the drive mode, the report processor 370 can translate each state machine report 382 into a control command 375 for execution by the self-propelled device 390.

In examples, the report processor 370 of the wearable computing device 360 can generate control commands 375 based on the user gestures 377 performed by the user. These control commands 375 can be transmitted to a self-propelled device 390, which can implement the control commands 375 on its drive system directly. Accordingly, sensor data processing can be performed by the wearable computing device 360 utilizing state machines in the memory into the control commands 375 before being transmitted over the communication link 371 via the communication interface 365 to the self-propelled device 390.

Drive Mode Methodology

Figure 4A:
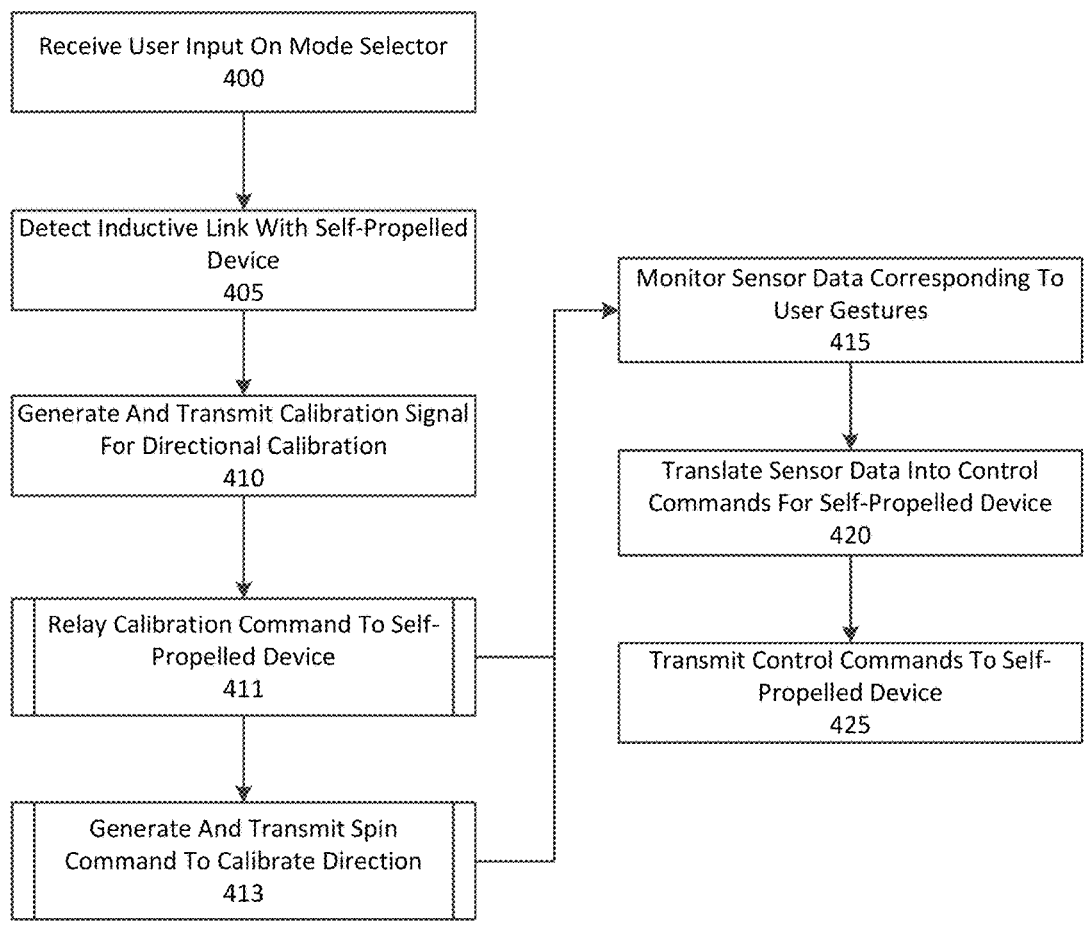
FIG. 4A is a high level flow chart describing an example method of translating sensor data by an example portable sensing device for implementation in a self-propelled device.

FIG. 4A is a high level flow chart describing an example method of translating sensor data by a portable sensing device for implementation in a self-propelled device. In the below description of FIG. 4A, reference may be made to like reference characters representing various features of FIG. 1A, 2, and also FIG. 3A for illustrative purposes. Furthermore, the method described in connection with FIG. 4A may be performed by an example wearable device 102 as illustrated in FIG. 1A or the wearable devices 200, 300, 360 as shown and described with respect to FIGS. 2, 3A, and 3B. Referring to FIG. 4A, the wearable device 200 can receive user input on the mode selector 110 to select a drive mode on the wearable device 200 (400). The wearable device 200 may then detect an inductive link or pairing 247 with a self-propelled device 250 (405), thereby initializing the drive mode on the self-propelled device 250 as well.

The wearable device 300 may then generate and transmit a calibration signal for directional calibration or alignment between the wearable device 300 and the self-propelled device 330 (410). In some examples, the wearable device 300 relays the calibration command to the self-propelled device 330 via a connected mobile computing device 320 (411). In variations, the calibration may be automated by the wearable device 300 or the mobile computing device 320 generating and transmitting a spin command for transmission to the self-propelled device 330, determining a direction to the self-propelled device 330 by detecting variations in the radiation pattern of the self-propelled device 330 as it spins, and transmitting a command to the self-propelled device 330 to directionally align its internal drive system with the wearable device 300 accordingly (413).

Once calibrated, the wearable device 300 can monitor sensor data 137 corresponding to user gestures 306 performed by the user (415). As described herein, the sensor data 137 can be actively monitored by processing resources of the wearable device 300 (e.g., a processing/translation engine), or by state machines in a memory 310 of the wearable device 300. Based on each identified user gesture 306, the wearable device 300 can translate the sensor data 137 and/or state machine reports 188 into control commands 108 for the self-propelled device 330 (420). Accordingly, the wearable device 300 can transmit the control commands 108 to the self-propelled device 330 for execution (425).

Figure 4B:
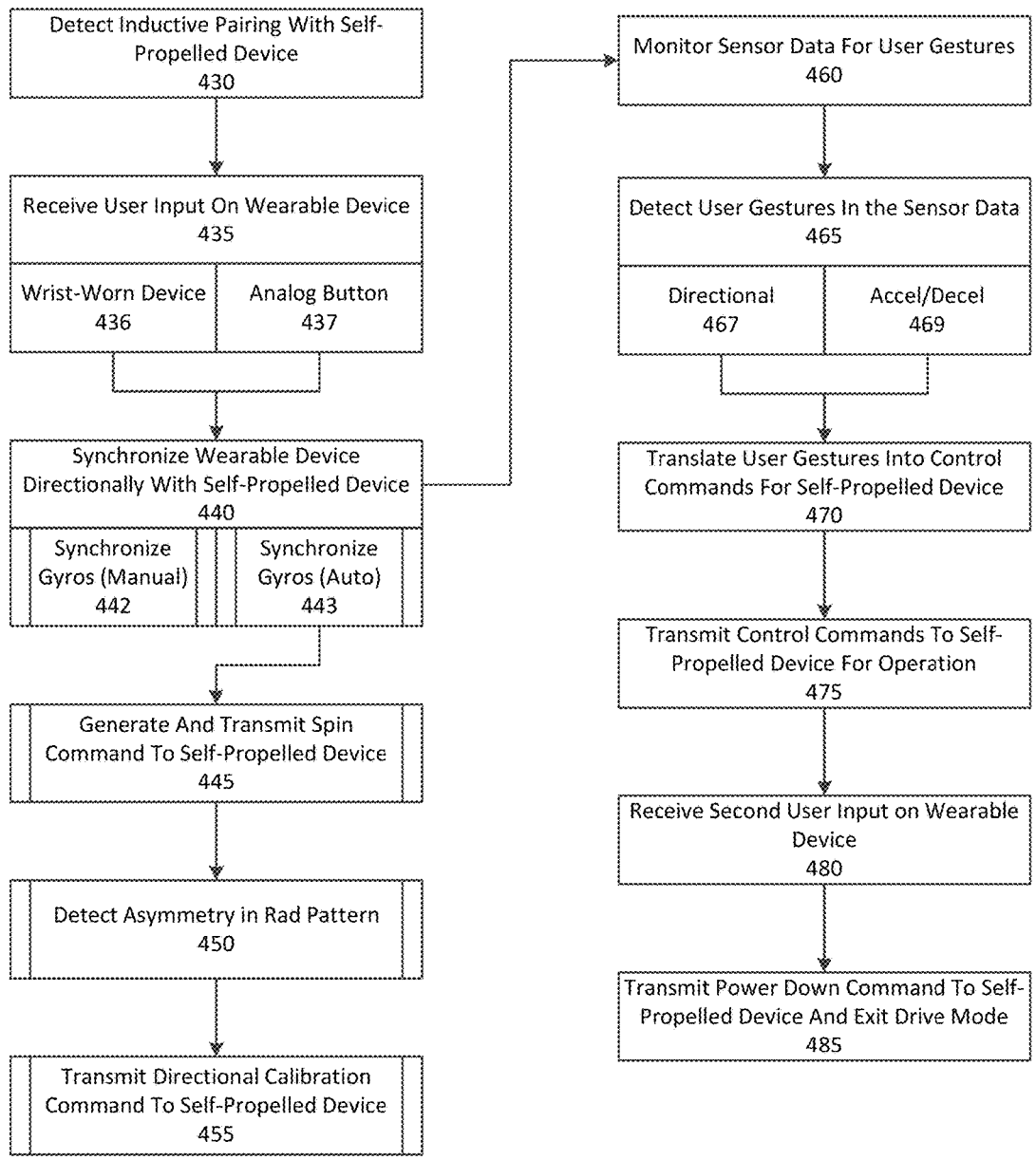
FIG. 4B is a low level flow chart describing an example method for translating sensor data by an example portable sensing device for implementation in a self-propelled device.

FIG. 4B is a low level flow chart describing an example method for translating sensor data by an example portable sensing device for implementation in a self-propelled device. In the below description of FIG. 4B, reference may be made to like reference characters representing various features of FIGS. 1A, 2, and 3A for illustrative purposes. Furthermore, the method described in connection with FIG. 4B may be performed by an example wearable device 102 as illustrated in FIG. 1A or the wearable devices 200, 300, 360 as shown and described with respect to FIGS. 2, 3A, and 3B. Referring to FIG. 4B, the wearable device 200 can detect an inductive pairing with a self-propelled device 250 (430). The wearable device 200 can further receive a user input on a mode selector 110 of the wearable device 200 (435) to select a drive mode. The wearable device 200 can be a wrist-worn device (436), and the mode selector 110 may be an analog button on an outer edge of the wearable device 200 (437).

In many aspects, the wearable device 300 can synchronize directionally with the self-propelled device 330 (440). In some cases, the user can manually synchronize the gyroscopic sensors (gyros) of both devices by manually aligning them, and performing an action, such as depressing the mode selector to calibrate the gyros (442). In other cases, the wearable device 300 can automatically synchronize the gyros (443). For automatic synchronization, the wearable device 300 can transmit a spin command to the self-propelled device 330 (445), detect the asymmetry in the radiation pattern of the self-propelled device 330 (e.g., the BLUETOOTH low energy radiation pattern) (450), and transmit a directional calibration command to directionally align the self-propelled device 330 with the wearable device 300 (455).

Once calibrated, the wearable device 200 can monitor sensor data 137 (460), and detect user gestures 106 in the in the sensor data 137 (465). Such gestures can correspond to various controls for the self-propelled device 250, such as directional controls (467) and acceleration and deceleration controls (469). Thus, the wearable device 200 can translate each of the user gestures 241 into a control command 273 for the self-propelled device 250 (470), and transmit the control commands 273 to the self-propelled device 250 for execution (475).

In some aspects, hybrid gestures may be utilized to trigger one or more functions of the drive mode. For example, the drive mode may be initiated by a "trigger gesture" instead of the user actively scrolling through available modes and selecting the drive mode. A preconfigured sensor pattern for the trigger gesture can be stored, and when identified (e.g., by a corresponding state machine or via any set of executing instructions by a processor), the wearable device 200 can automatically initialize the drive mode which can instantaneously connect the wearable device 200 to the self-propelled device 250 can cause the self-propelled device 250 to perform an action. Feedback on the wearable device 200 can provide the user which an indication that drive mode has been initialized automatically. Furthermore, the self-propelled device 250 can also provide feedback indicating the drive mode, and can thereafter remain in operational control of the wearable device 200. In certain implementations, the trigger gesture can be prioritized over other gestures performed by the user, which can override any other modes currently executing on the wearable device 200.

When the user wishes to end the drive mode, the wearable device 200 can detect a second user input, for example, on the mode selector 110 of the wearable device 200 (480). In response to the second user input, the wearable device 200 can transmit a power down command to the self-propelled device 250 and exit the drive mode (485).

In some aspects, the wearable device 300 can initiate the user experience based on an initial radio-frequency scan of proximate available devices. The scan may be performed by the wearable device itself 300, or by a connected mobile computing device 320, and can identify nearby BLUETOOTH-enabled and/or Wi-Fi enabled devices, such as a self-propelled device 330, another wearable device, network devices (e.g., devices potentially associated with virtual resources), or a smart home device. The initial scan, or in some aspects, periodic scans, can identify such connectable devices and limit the modal options of the wearable device 300. For example, a scan may reveal that no self-propelled devices 330, smart home devices, other peripheral devices, or network devices are within connectable range, and can consequently limit the available mode choices to only those standalone modes that do not require a connection with another device (e.g., finder mode, sword mode, or default mode). As another example, a scan may reveal that a smart home device is within connectable range of the wearable device 300, which can trigger a notification to the user and provide the control mode option.

Figure 5:
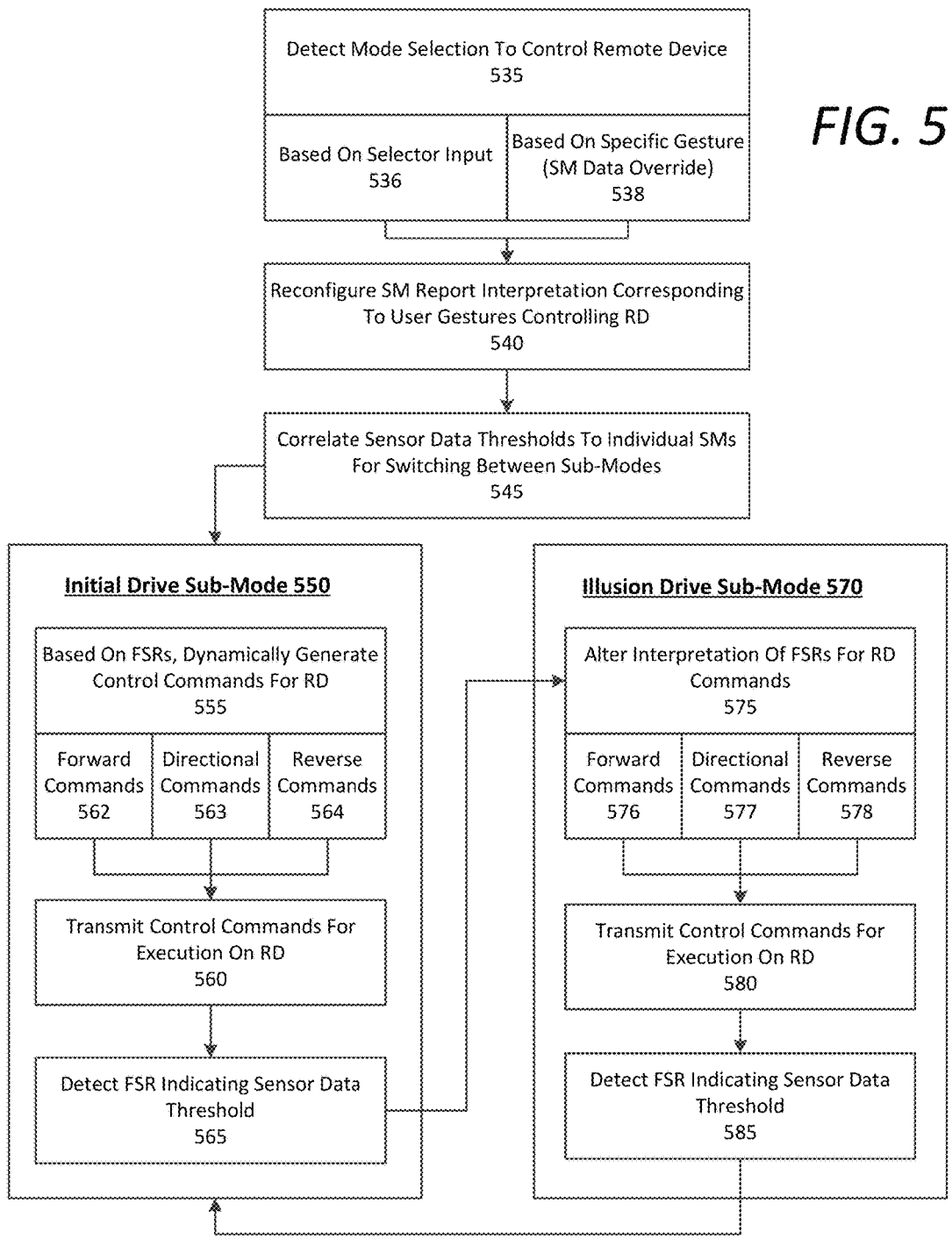
FIG. 5 is a flow chart describing a state machine-based example method of controlling a remotely operated device using a modular sensing device.

FIG. 5 is a flow chart describing a state machine-based example method of controlling a remotely operated device using a modular sensing device. In the below discussion of FIG. 5, reference may be made to reference characters representing like features as shown and described with respect to FIGS. 1A and 1B. Furthermore, the methods and processes described with respect to FIG. 5 may be performed by an example modular sensing device 150 as shown and described with respect to FIG. 1B. Still further, the steps described in FIG. 5 represent steps performed to produce a palm control illusion (530) in the drive mode, as described herein. Referring to FIG. 5, the modular sensing device 150 can detect a mode selection to control a remotely operated device 140 (e.g., a drive mode) (535). The mode selection can be based on an input on the mode selector 110 (536), or based on a specified gesture performed by the user (e.g., a push gesture with the wearable device) (538).

In response to the mode selection, the modular sensing device 150 can reconfigure state machine report interpretation corresponding to user gestures for controlling the remotely operated device 140 (540). As such, final state machine reports 188 can be interpreted by the modular sensing device 150 as control commands 162 for operating the remote device 140. Furthermore, in certain implementations, the modular sensing device 150 can correlate sensor data thresholds to individual state machines for switching between sub-modes (545). Specifically, the final state reports 188 from those state machines can comprise sub-mode triggers 186 indicating that a gesture or combination of gestures has been performed (e.g., raising an arm above a threshold angle) that causes the modular sensing device 150 to reconfigure its interpretation of certain final state reports 188.

When initializing the drive mode, the modular sensing device 150 can begin in an initial drive sub-mode (550), which enables initial or default control of the remote device 140 using a specified set of gestures. In the initial drive sub-mode, the modular sensing device 150 can dynamically generate control commands 162 for the remote device 140 based on final state reports 188 received from the state machines (555). Such commands 162 can include forward acceleration commands (562), directional or steering commands (563), and/or deceleration or reverse commands (564). Furthermore, the initial drive sub-mode (550) can correspond to user control of the remote device 140 moving forward and away from the user. After generating each command 162, the modular sensing device 150 can transmit the control command 162 to the remote device 140 for execution (560). Accordingly, the user can control the remote device 140 using arm gestures (or other gestures depending on the wearable device), causing the remote device 140 to accelerate and maneuver accordingly. In many aspects, this initial drive mode (550) can be perceived as the user "pushing" the remote device 140, and steering the remote device while performing a pushing gesture.

During operation, the modular sensing device 150 can detect a final state report 188 from a specified state machine correlated to a sensor data threshold (565). As described herein, this final state report 188 can comprise a sub-mode trigger 186 indicating that the user has performed a threshold gesture. In certain examples, the threshold gesture can correspond to the user raising and/or lowering an arm across a threshold angle (e.g., 45 degrees). Additionally or alternatively, the threshold gesture can correspond to the user turning a palm from downwards to upwards. Furthermore, in response to the detected sub-mode trigger 186, the modular sensing device 150 can reconfigure certain final state report 188 interpretations in an illusion drive sub-mode (570). In certain aspects, the sub-mode trigger 186 causes the modular sensing device 150 to begin interpreting a new set of final state reports 188 that were previously not relevant in the initial drive sub-mode (550). Additionally or alternatively, interpretation of certain final state reports may be switched. For example, interpretation of the final state reports 188 for left turns versus right turns may be switched.

Thus, the modular sensing device 150 can alter interpretation of final state reports 188 in generating control commands 162 for the remote device 140 (575). For example, the modular sensing device 150 can utilize a different final state report 188 from a different state machine to generate forward acceleration commands for the remote device 140 (576). Also, the directional or steering commands can be triggered by different final state reports 188 as compared to the initial drive sub-mode (550). In one example, the modular sensing device 150 can switch the state machines corresponding to such directional steering commands. Thus, a leftward arm movement in the illusion drive sub-mode (570) can correspond to a right turn by the remote device 140. Thus, as the remote device 140 travels back towards the user, an illusion is perceived that the user's leftward arm movement directly correlates to a force pulling the remote device 140 leftward from the user's perspective. Still further, the modular sensing device 150 can alter an interpretation of a particular final state report 188 from a state machine to generate deceleration or reverse commands (578).

When such gestures are completed by the user wearing the modular sensing device 150, the modular sensing device can dynamically generate and transmit the control commands 162 to the remote device 140 for execution (580). Thus, as long as another threshold gesture is not detected, the user can operate the remote device 140 in the illusion drive sub-mode (570), which can be perceived as the user "pulling" the remote device and steering the remote device in conjunction with the pulling arm gesture. While in the illusion drive mode (570), the modular sensing device 150 can receive a final state report 188 indicating another sensor data threshold (585). In some examples, the threshold can correspond to crossing the previous threshold in a reverse or an inverse manner (e.g., going from palm up to palm down and/or lowering the arm below 45 degrees in relation to the horizontal plane). In variations, the drive mode can include a third, fourth, fifth, or n drive sub-mode in the underlying drive mode, in which the modular sensing device 150 reconfigures interpretation of certain final state reports 188, or begins to interpret new final state reports 188. In any case, upon detecting the final state report 188 indicating the respective sensor data threshold, the modular sensing device 150 can revert to the initial drive sub-mode (550), or a separate drive sub-mode depending on the gesture threshold.

In certain implementations, some control commands 162 can be attributed to two or more state machines. For example, a first state machine can be associated with an acceleration command in the drive mode, and a second state machine can also be associated with the acceleration command. Thus, final state reports 188 from each of these state machines can cause the modular sensing device 150 to generate an acceleration command. Along these lines, two or more state machines can also cause the modular sensing device 150 to generate the same output via the haptic 192, visual 194, and audio 196 systems in the same mode. For example, swinging gestures may be performed from multiple relative angles (e.g., corresponding to tennis swings or sword fighting strokes). In certain modes, final state reports 188 from state machines corresponding to each of such swings can cause the modular sensing device 150 to output the same or similar sounds, vibrations, and/or light outputs.

Figure 6:
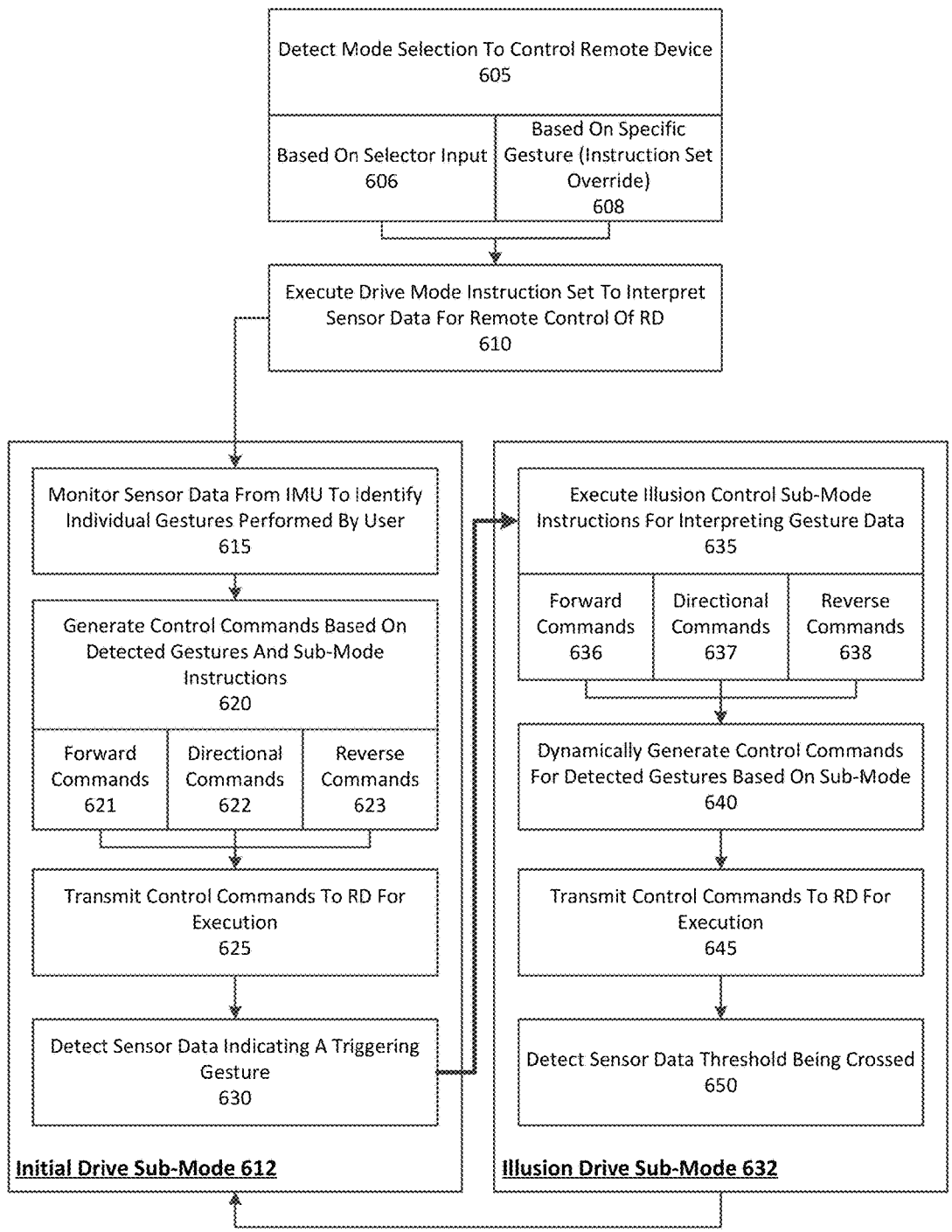
FIG. 6 is a flow chart described an instruction-based example method of controlling a remotely operated device using a modular sensing device.

FIG. 6 is a flow chart described an instruction-based example method of controlling a remotely operated device using a modular sensing device. In the description of FIG. 6 below, reference may be made to reference characters representing like features as shown and described with respect to FIGS. 1A and 1B. Furthermore, the processes discussed with respect to FIG. 6 may be performed by an example modular sensing device 100 as shown and described with respect to FIG. 1A. As such, the modular sensing device 100 may be incorporated or integrated as a part of a mobile computing device, such as a wrist-worn computing device. In variations, the modular sensing device 100 can be decoupled from the wearable device 102, and can be insertable into a plurality of compatible devices, such as wielded toys (e.g., toy wands, sabers, companion toys, etc.). In any case, the modular sensing device 100 can be operable in a plurality of modes, each include an instruction set that can further include sub-mode instructions executable when certain triggering conditions exist in a current mode. For example, when executing the drive mode to operate the remote device 140, the drive mode instructions 117 can include sub-mode instruction sets automatically executed by the modular sensing device when, for example, a threshold gesture or other triggering gesture is detected. As such, within the drive mode, the modular sensing device 100 can execute sub-mode instructions that produce a perceived palm control illusion (600) in the operation of the remote device 140.

Referring to FIG. 6, the modular sensing device 100 can detect a mode selection to control the remote device 140 (605). The mode selection can be detected based on a user input 111 on the mode selector (606), or based on a specific gesture performed by the user (608). In some aspects, the specific gesture can be detected by processing resources 120 of the modular sensing device 100 monitoring sensor data 137 from the IMU 135 of the modular sensing device 100. Furthermore, upon detecting the specified gesture (e.g., a pushing action with an arm on which the wearable device 102 is worn), the modular sensing device 100 can automatically initiate the drive mode regardless of the current mode of the modular sensing device 100. Accordingly, detection of the specified gesture causes an instruction set override in which the processor 120 terminates a current mode (or places the current mode in standby state), and automatically executes the drive mode instruction set 117 to initiate a communication link 104 with the remote device 140, and interpret the sensor data 137 in accordance with the drive mode instructions 117 to enable the user to remotely operate the remote device 140 (610).

Upon initiating the communication link 104, the modular sensing device 100 can interpret the sensor data 137 in an initial drive sub-mode (612), which, in certain implementations, can correspond to the user controlling the remotely operated device 140 as it accelerates away from the user. Thus, the modular sensing device can monitor the sensor data 137 from the IMU 135 to identify individual gestures performed by the user (615). As described herein, such gestures can comprise arm and/or hand gestures in which the user moves an arm upwards, downwards, side-to-side, and everything in between. The modular sensing device 100 can generate control commands 108 based on the detected gestures and the initial drive sub-mode instructions (620).

The control commands 108 can include forward acceleration commands, which cause the remote device 140 to accelerate away from the user (621). In the initial drive sub-mode, such acceleration commands can correspond to the user raising an arm above a certain acceleration angle (e.g., above a zero angle corresponding to a plane parallel to an underlying surface, such as a floor). The control commands 108 can further include directional steering commands, which cause the remote device 140 to steer right and left (622). In the initial drive sub-mode, the steering commands can be correlated directly to the user moving the arm to the right and left while the arm is raised above the acceleration angle—where gesturing the arm right correlates to the remote device turning right, and gesturing left corresponds to the remote device turn left. The control commands 108 can further include deceleration and/or reverse commands, which can cause the remote device 140 to decelerate and/or reverse in relation to the remote device 140 traveling away from the user (623). In certain implementations, the deceleration or reverse commands can correspond to the user lower the arm below the acceleration angle. Other gestures can be correlated to additional control commands 108, such as a gesture specific to a spin command. Furthermore, in some aspects, the remote device 140 can include voice recognition technology such that the user can provide voice input that can cause the remote device 140 to automatically perform a set of actions, or maneuver to a certain location autonomously (e.g., back to the user).

For each generated control command 108, the modular sensing device 100 can transmit the control commands 108 to the remote device 140 via the communications module 125 for execution (625). While operating in the initial drive sub-mode, the modular sensing device 100 can detect sensor data 137 indicating a triggering or threshold gesture to switch the sub-mode of the drive mode (630). In response to the triggering gesture, the modular sensing device 100 can initiate an illusion drive sub-mode (632), in which the modular sensing device 100 executes illusion control sub-mode instructions for interpreting the sensor data 137 (635). In some examples, the triggering gesture can comprise an angular threshold being crossed, such as the user raising the arm above a certain angle in relation to the horizontal (e.g., 45 degrees). Additionally or alternatively, the modular sensing device 100 can determine from the sensor data 137 that the user has performed a set of gestures, such as turning a palm from downward facing to upward facing.

Execution of the illusion control sub-mode instructions can cause the modular sensing device 100 to alter interpretation of gestures corresponding to one or more of the forward acceleration commands (636), the directional commands (637), and the reverse or deceleration commands (638). In certain examples, the modular sensing device 100 can monitor for a new set of accelerometer and/or gyroscope data signatures that correspond to each of the forward acceleration, directional, and deceleration commands. Furthermore, the switch from the initial drive sub-mode to the illusion drive sub-mode can be perceived as seamless with regard to both the user's arm motion (e.g., a seamless transition from palm-down and raising the arm to palm up and continuing to raise the arm), and the remotely operated device 140 (e.g., moving forward away from the user to turning around and moving forward towards the user). Accordingly, in the illusion drive sub-mode, the modular sensing device 100 can dynamically generate control commands 108 for detected gestures based on the new interpretation of the sensor data 137 (640), and transmit the control commands 108 to the remotely operated device 140 for execution (645).

In some aspects, as the remote device 140 turns around, the modular sensing device 100 can alter interpretation of the sensor data 137 in generating the control commands 108. For example, a gesture corresponding to the user's palm facing upward and the user's arm being outward and upwardly extended, modular sensing device 100 can interpret such a gesture as a forward acceleration command 108 in the illusion control mode, in which the remote device 140 accelerates forward towards the user. Furthermore, with the same arm position, gestures corresponding to the user moving the arm left can correlate to the remote device 140 turning right, and gestures corresponding to the user moving the arm right can correlate to the remote device turning left, as the remote device 140 moves toward the user. Thus, in transitioning to the illusion drive sub-mode, the modular sensing device 100 can reverse the directional command interpretations. Further still, when the user extends the forearm downward with the palm up, the modular sensing device 100 can identify the gesture in the sensor data 137, and generate a deceleration command accordingly. Such sensor data interpretations between the initial drive mode and the illusion drive mode can produce an illusion that the user is operating the remote device 140 by means of an invisible force. Alternative and addition interpretations are contemplated that further add to the palm control illusion, including gestures in which the user motions the arm downwards below the horizontal, rotates the arm, or where the user pivots around a vertical axis while performing various hand or arm gestures while wearing the wearable device 102. Any such gestures can trigger an additional sub-mode that causes the modular sensing device 100 to attribute different sensor data signatures to the specified control commands 108 for the remote device 140.

Still further, the remotely operated device 140 can comprise a multi-body self-propelled device in which the control commands 108 can be implemented to not only control the drive system of the device 140, but also a separately coupled component. Additionally or alternatively, the supplementary commands can be provided separately from the modular sensing device 100, such as from the user's voice or a mobile computing device of the user that executes a designated control application for operating the remote device 140.

While in the illusion drive sub-mode, at any time the modular sensing device 100 can detect another triggering or threshold gesture to change sub-modes within the drive mode (650). In one aspect, the gesture can correspond to the user initiating the initial drive sub-mode (612)—which can correspond to a reverse gesture of the triggering gesture to initiate the illusion drive sub-mode (632). For example, the user can transition from a palm up and arm extending outward and upward above a predetermined angle relative to the horizontal, to palm down and arm extended outward below the predetermined angle.

Example Robotic Device

Figure 7:
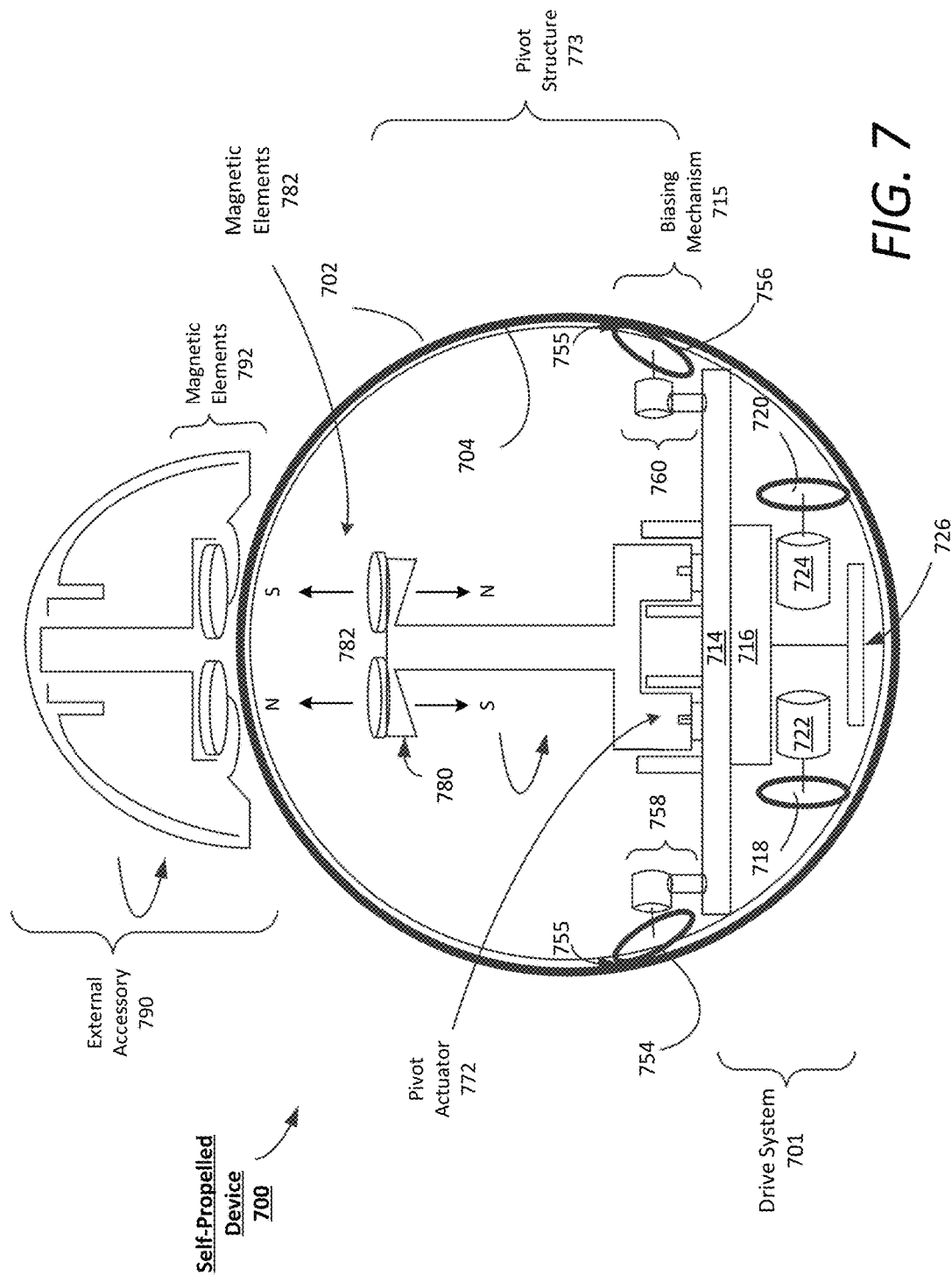
FIG. 7 is a schematic illustrating an example self-propelled device with which wearable devices as describe with other examples can be implemented, as described herein.

FIG. 7 is a schematic illustrating an example self-propelled device with which example wearable devices may be implemented, as described herein. The self-propelled device 700 can be of a size and weight allowing it to be easily grasped, lifted, and carried by a user. The self-propelled device 700 can include a spherical housing 702 with an outer surface that makes contact with an external surface of a corresponding magnetically coupled accessory device 790 as the self-propelled device 700 rolls. In addition, the spherical housing 702 includes an inner surface 704. Additionally, the self-propelled device 700 includes several mechanical and electronic components enclosed by the spherical housing 702. In an example, self-propelled device 700 includes magnetic elements 782 which are supported within spherical housing 702 and which magnetically interact with complementary magnetic elements 792 of the accessory device 790. The magnetic interaction and coupling can occur and/or be maintained while the self-propelled device 700 moves.

The spherical housing 702 can be composed of a material that transmits signals used for wireless communication, yet is impervious to moisture and dirt. The spherical housing 702 can comprise a material that is durable, washable, and/or shatter-resistant. The spherical housing 702 may also be structured to enable transmission of light and can be textured to diffuse the light.

In one variation, the spherical housing 702 is made of sealed polycarbonate plastic. In one example, the spherical housing 702 comprises two hemispherical shells with an associated attachment mechanism, such that the spherical housing 702 can be opened to allow access to the internal electronic and mechanical components.

Several electronic and mechanical components are located inside the envelope for enabling processing, wireless communication, propulsion and other functions. In an example, the components include a drive system 701 to enable the device to propel itself. The drive system 701 can be coupled to processing resources and other control mechanisms, as described with other examples. The carrier 714 serves as the attachment point and support for components of the drive system 701. The components of the drive system 701 are not rigidly attached to the spherical housing 702. Instead, the drive system 701 can include a pair of wheels 718, 720 that are in frictional contact with the inner surface 704 of the spherical housing 702.

The carrier 714 can be in mechanical and electrical contact with an energy storage 716. The energy storage 716 provides a reservoir of energy to power the device 700 and electronics and can be replenished through an inductive charge port 726. The energy storage 716, in one example, is a rechargeable battery. In one variation, the battery is composed of lithium-polymer cells. In other variations, other rechargeable battery chemistries are used.

The carrier 714 can provide the mounting location for most of the internal components, including printed circuit boards for electronic assemblies, sensor arrays, antennas, and connectors, as well as providing a mechanical attachment point for internal components.

The drive system 701 can include motors 722, 724 and wheels 718, 720. The motors 722 and 724 connect to the wheels 718 and 720, respectively, each through an associated shaft, axle, and gear drive (not shown). The perimeter of wheels 718 and 720 are two locations where the interior mechanism is in mechanical contact with the inner surface 704. The locations where the wheels 718 and 720 contact the inner surface 704 are an essential part of the drive mechanism of the self-propelled device 700, and so are preferably coated or covered with a material to increase friction and reduce slippage. For example, the wheels 718 and 720 can be covered with silicone rubber tires.

In some variations, a biasing assembly 715 is provided to actively force the wheels 718, 720 against the inner surface 704. In an example illustrated by FIG. 7, the biasing assembly 715 can comprise two or more separate portal axles 758, 760 to actively force the drive system wheels 718, 720 against the inner surface 704. The portal axles 758, 760 may include biasing elements 754, 756 (or springs) which include tips 755 or ends that press against the inner surface 704 with a force vector having a vertical value. The vertical force from the bias springs 754, 756 pressing against the inner surface 704 actively forces the drive system 701 and its respective wheels 718, 720 against the inner surface 704, thereby providing sufficient force for the drive system 701 to cause the self-propelled device 700 to move.

The portal axles 758, 760 comprising the independent biasing elements 754, 756 can be mounted directly onto the carrier 714. The biasing elements 754, 756 coupled to the portal axles 758, 760 may be in the form of torsion springs which instigate a force against the inner surface 704. As an addition or alternative, the biasing elements 754, 756 may be comprised of one or more of a compression spring, a clock spring, or a tension spring. Alternatively, the portal axles 758, 760 can be mounted, without inclusion of springs, to maintain a force pressing the drive system 701 and wheels 718, 720 against the inner surface 704, and allow sufficient traction to cause the self-propelled device 700 to move.

According to many examples, the self-propelled device 700 can include an inductive charge port 726 to enable inductive charging of a power source 716 used to provide power to the independent motors 722, 724 that power the wheels 718, 720. The self-propelled device 700 can further include a magnet holder 780 coupled to the carrier 714. The magnet holder 780 can include a set of magnetically interactive elements 782, such as elements comprised of ferrous materials, and/or electromagnets or permanent magnets. Likewise, the external accessory 790 can also include complementary magnets 792 for enabling the magnetic coupling. Thus, the magnet holder 780 and the external accessory 790 can comprise one or more of any combination of magnetically interactive metals, ferromagnetic elements, neodymium, yttrium/cobalt, alnico, or other permanent elemental magnets, other "rare-earth" magnets, electromagnets, etc.

In variations, the magnet holder 780 can include a set of magnetic elements 782 (e.g., a magnet pair) which can be oriented to have opposing polarity. For example, as shown in FIG. 7, the magnetic elements 782 include a first magnet and a second magnet, where the first magnet can be oriented such that its north magnetic pole faces upwards and its south magnetic pole faces downwards. The second magnet can be oriented such that its south magnetic pole faces upwards and its north magnetic pole face downwards.

In variations, the magnet holder 780 and an external accessory 790 can each house any number or combination of complementary magnets or magnetic components. For example, a single magnetic component may be housed in either the self-propelled device 700 or in the corresponding external accessory 790, and be arranged to magnetically interact with a plurality of magnetic components of the other of the external accessory 790 or the self-propelled device 700. Alternatively, for larger variations, magnetic arrays of three or more magnets may be housed within the spherical housing 702 to magnetically interact with a corresponding magnetic array of the external accessory 790.

The magnet holder 780 can be placed on an internal pivoting structure 773 that enables the magnet holder 780 to pivot within the spherical housing 702. The pivot structure 773 can include a single or multiple guiderails and can be driver by one or more pivot actuators 772. Accordingly, in examples provided herein, user gestures can be performed by the user of the wearable device that not only cause the self-propelled device 700 to accelerate and maneuver, but also to drive the pivot actuator 772 to can the magnet holder 780 to rotate within the spherical housing 702. For wrist-worn devices, acceleration and maneuver commands may be simply arm gestures, such as raising, lowering, and turning the arm on which the wearable device is worn. Pivot commands may be different arm or wrist gestures, such as pivoting or rotating the wrist or arm, or a combination of such actions.

When the pivot structure 773 is driven by the pivot actuator 772 to pivot, the magnetic interaction between the magnets 782 of the self-propelled device 700 and the magnets 792 of the external accessory 790 causes the external accessory 790 to pivot as well. Thus, gesture responses by the self-propelled device 700 can include pivoting or turning the external accessory 790 as well as maneuvering and accelerating the self-propelled device 700.

In some examples, the biasing assembly 715 is formed such that the wheels 718, 720 and the tip ends 755 of the biasing elements 754, 756 are almost constantly engaged with the inner surface 704 of the spherical housing 702. As such, much of the power from the motors 722, 724 is transferred directly to rotating the spherical housing 702, as opposed to causing the internal components (i.e., the biasing assembly 715 and internal drive system 701) to pitch. Thus, while motion of the self-propelled device 1500 may be caused, at least partially, by pitching the internal components (and therefore the center of mass), motion may also be directly caused by active force of the wheels 718, 720 against the inner surface 704 of the spherical housing 702 (via the biasing assembly 715) and direct transfer of electrical power from the motors 722, 724 to the wheels 718, 720. As such, the pitch of the biasing assembly 715 may be substantially reduced, and remain substantially constant (e.g., substantially perpendicular to the external surface on which the self-propelled device 700 moves). Additionally or as an alternative, the pitch of the biasing assembly 715 may increase (e.g., to over 45 degrees) during periods of hard acceleration or deceleration. Furthermore, under normal operating conditions, the pitch of the biasing assembly 715 can remain stable or subtly vary (e.g., within 10-15 degrees).

In some variations, the magnetic elements 782 can be replaced or augmented with magnetic material, which can be included on, for example, the tip ends 755 of the biasing elements 754, 756. The tip ends 755 can be formed of a magnetic material, such as a ferrous metal. Such metals can include iron, nickel, cobalt, gadolinium, neodymium, samarium, or metal alloys containing proportions of these metals. Alternatively, the tip ends 755 can include a substantially frictionless contact portion, in contact with the inner surface 704 of the spherical housing 702, and a magnetically interactive portion, comprised of the above-referenced metals or metal alloys, in contact or non-contact with the inner surface 704. As another variation, the substantially frictionless contact portion can be comprised of an organic polymer such as a thermoplastic or thermosetting polymer.

In some examples, the tip ends 755 can be formed of magnets, such as polished neodymium permanent magnets. In such variations, the tip ends 755 can produce a magnetic field extending beyond the outer surface of the spherical housing 702 to magnetically couple with the external accessory device. Alternatively still, the tip ends 755 can include a substantially frictionless contact portion, and have a magnet included therein.

Alternatively still, a magnetic component of the self-propelled device 700 may be included on any internal component, such as the carrier 714, or an additional component coupled to the biasing assembly 715 or the carrier 714.

In further examples, one or more of the magnetic elements 782, the tip ends 755, and/or the complementary magnets of the external accessory device can comprise any number of electro- or permanent magnets. Such magnets may be irregular in shape to provide added magnetic stability upon motion of the self-propelled device 700. For example, the magnetic elements 782 of the self-propelled device 700 can be a single or multiple magnetic strips including one or more tributary strips to couple with the complementary magnet(s) of the accessory device. Additionally, or alternatively, the tip ends 755 can also include a single or multiple magnets of different shapes which couple to complementary magnets of the accessory device.

Alternatively, the magnetic coupling between the self-propelled device 700 and the accessory device can be one which creates a stable magnetically repulsive state. For example, the magnetic elements 782 can include a superconductor material to substantially eliminate dynamic instability of a repelling magnetic force in order to allow for stable magnetic levitation of the accessory device in relation to the magnetic elements 782 while the spherical housing 702 rotates on the underlying surface. In similar variations, a diamagnetic material may be included in one or more of the self-propelled device 700, the tip ends 755, or the external accessory device, to provide stability for magnetic levitation. Thus, without the use of guiderails or a magnetic track, the self-propelled device 700 may be caused to maneuver in any direction with the external accessory device remaining in a substantially constant position along a vertical axis of the self-propelled device 700 (Cartesian or cylindrical z-axis, or spherical r-coordinate with no polar angle (θ)).

Hardware Diagrams

Figure 8:
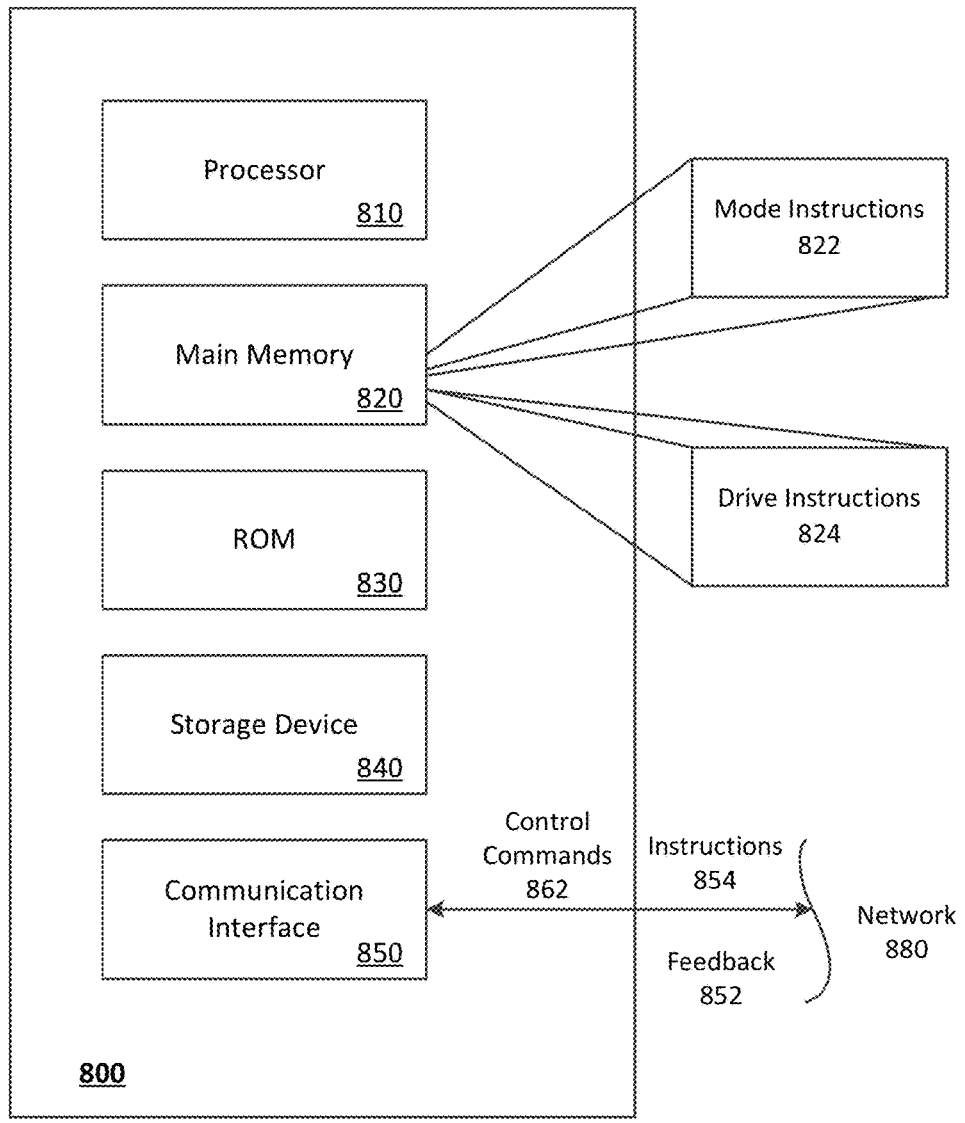
FIG. 8 is a block diagram of an example computer system upon which examples described herein may be implemented.

FIG. 8 is a block diagram that illustrates a computer system upon which examples described may be implemented. For example, one or more components discussed with respect to the self-propelled device of FIGS. 2, 3A, 3B, and 7, and the methods described herein, may be performed by the system 800 of FIG. 8.

In one implementation, the computer system 800 includes processing resources 810, a main memory 820, ROM 830, a storage device 840, and a communication interface 850. The computer system 800 includes at least one processor 810 for processing information and a main memory 820, such as a random access memory (RAM) or other dynamic storage device, for storing information and instructions to be executed by the processor 810. The main memory 820 also may be used for storing temporary variables or other intermediate information during execution of instructions to be executed by the processor 810. The computer system 800 may also include a read only memory (ROM) 830 or other static storage device for storing static information and instructions for the processor 810. A storage device 840, such as a magnetic disk or optical disk, is provided for storing information and instructions. For example, the storage device 840 can correspond to a computer-readable medium that store instructions performing sensor data processing and translation operations as discussed herein.

The communication interface 850 can enable computer system 800 to communicate with a computing device and/or wearable device (e.g., via a cellular or Wi-Fi network) through use of a network link (wireless or wired). Using the network link, the computer system 800 can communicate with a plurality of devices, such as the wearable device, a mobile computing device, and/or other self-propelled devices. The main memory 820 of the computer system 800 can further store the drive instructions 824, which can be initiated by the processor 810. Furthermore, the computer system 800 can receive control commands 862 from the wearable device and/or mobile computing device. The processor 810 can execute the drive instructions 824 to process and/or translate the control commands 862—corresponding to user gestures performed by the user—and implement the control commands 852 on the drive system of the self-propelled device.

Additionally, the main memory 820 can further include mode instructions 824, which the processor 810 can execute to place the self-propelled device in one or multiple modes to interact with the wearable device. In some examples, execution of the mode instructions 822 can place the self-propelled device in an operational mode that provides feedback 852 and/or instructions 854 to the wearable device over the network 880 (e.g., in training mode).

Examples described herein are related to the use of computer system 800 for implementing the techniques described herein. According to one example, those techniques are performed by computer system 800 in response to processor 810 executing one or more sequences of one or more instructions contained in main memory 820. Such instructions may be read into main memory 820 from another machine-readable medium, such as storage device 840. Execution of the sequences of instructions contained in main memory 820 causes processor 810 to perform the process steps described herein. In alternative implementations, hard-wired circuitry and/or hardware may be used in place of or in combination with software instructions to implement examples described herein. Thus, the examples described are not limited to any specific combination of hardware circuitry and software.

Figure 9:
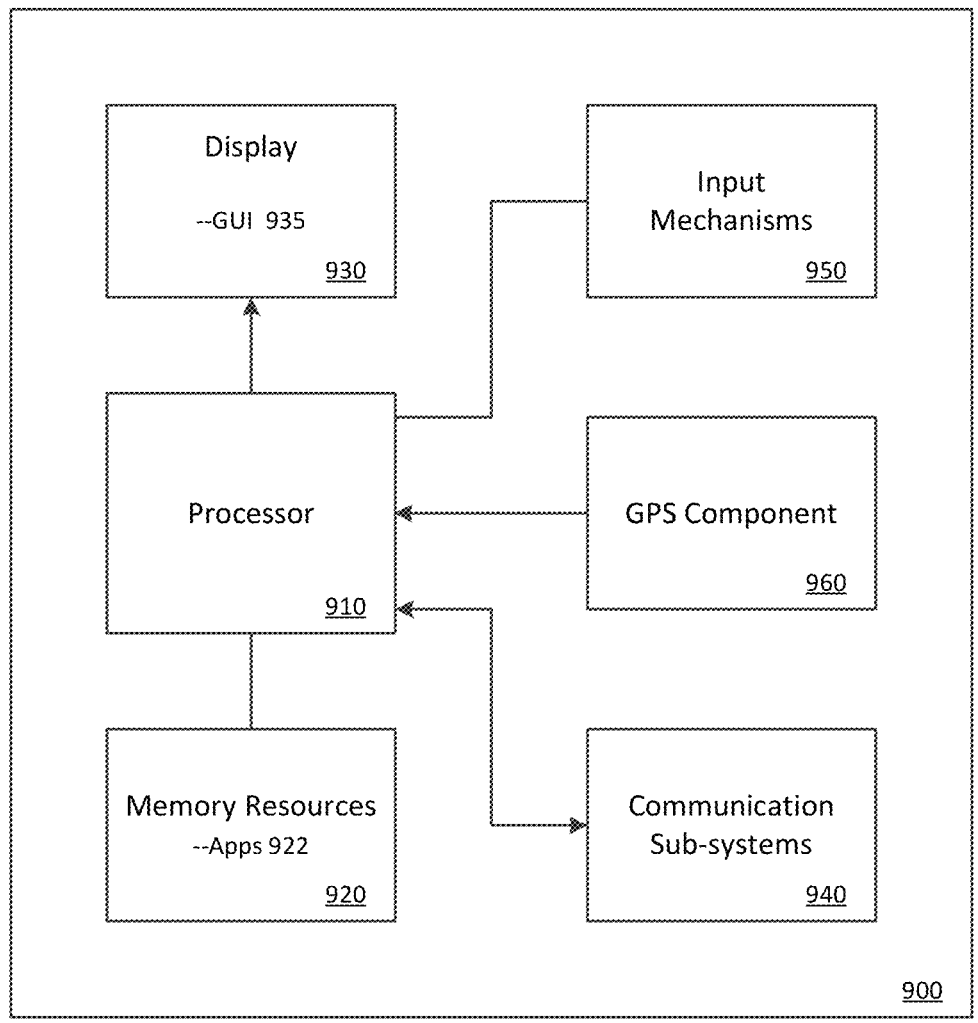
FIG. 9 is a block diagram of a mobile computing device upon which examples described herein may be implemented.

FIG. 9 is a block diagram that illustrates a mobile computing device upon which examples described herein may be implemented, such as the mobile computing device 320 of FIG. 3A. In one example, the computing device 900 may correspond to, for example, a cellular communication device (e.g., feature phone, smartphone, etc.) that is capable of telephony, messaging, and/or data services. In variations, the computing device 900 can correspond to, for example, a tablet or wearable computing device.

In an example of FIG. 9, the computing device 900 includes a processor 910, memory resources 920, a display device 930 (e.g., such as a touch-sensitive display device), one or more communication sub-systems 940 (including wireless communication sub-systems), input mechanisms 950 (e.g., an input mechanism can include or be part of the touch-sensitive display device), and one or more location detection mechanisms (e.g., GPS component) 960. In one example, at least one of the communication sub-systems 940 sends and receives cellular data over data channels and voice channels.

The memory resources 920 can store a designated control application 922, as one of multiple applications, to initiate the communication sub-system 940 to establish one or more wireless communication links with the self-propelled device and/or a wearable device. Execution of the control application 922 by the processor 910 may cause a specified graphical user interface (GUI) 935 to be generated on the display 930. Interaction with the GUI 935 can enable the user to calibrate the forward directional alignment between the self-propelled device and the computing device 900. Furthermore, the GUI 935 can allow the user to initiate a task-oriented operation (e.g., a game) to be performed by the user in conjunction with operating the self-propelled device with user gestures using the wearable device, as described herein.

Figure 10:
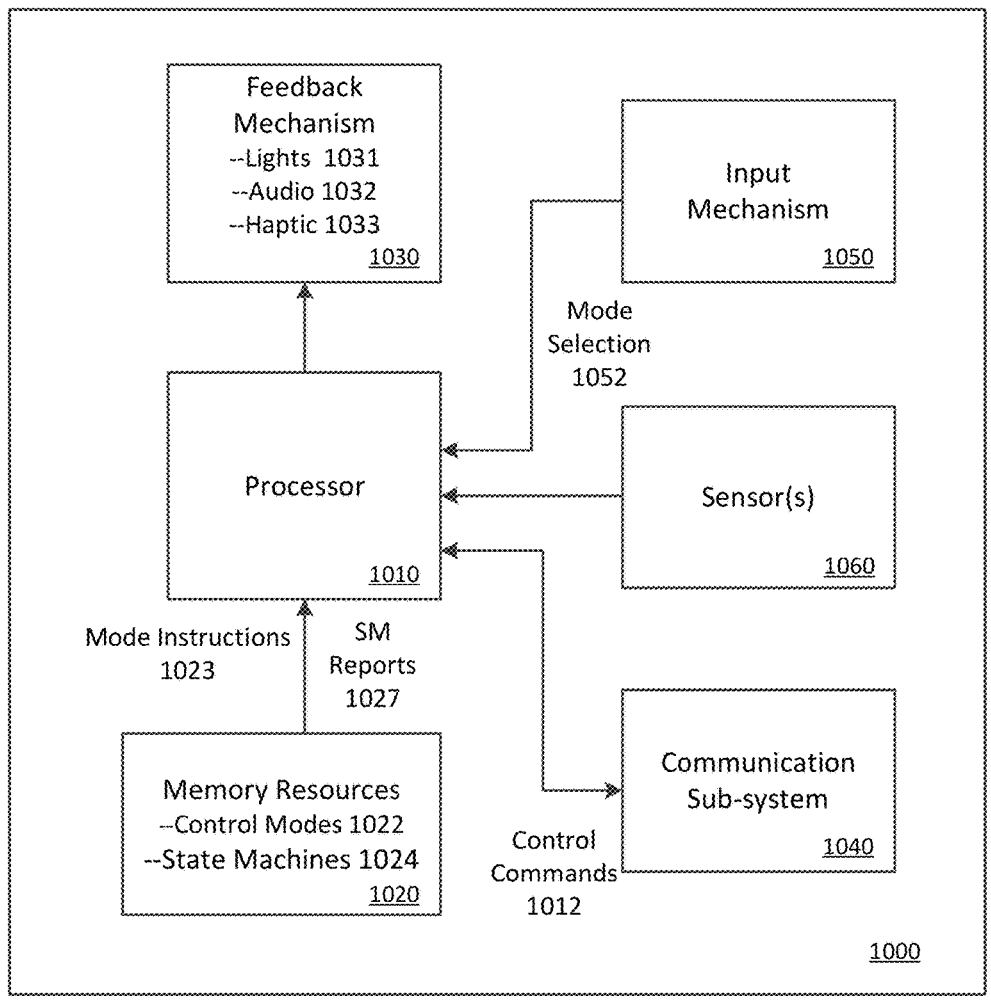
FIG. 10 is a block diagram of an example portable sensing device upon which examples described herein may be implemented.

FIG. 10 is a block diagram of an example portable sensing device upon which examples described herein may be implemented, such as the wearable device 102 of FIG. 1A.

In an example of FIG. 10, the portable sensing device 1000 includes a processor 1010, memory resources 1020, a feedback mechanism 1030 (e.g., audio 1032, haptic 1033, visual 1031 devices), a communication sub-systems 1040 (e.g., wireless communication sub-systems such as BLUETOOTH low energy), one or more sensors 1060 (e.g., a gyroscopic sensor or accelerometer) and an input mechanism 1050 (e.g., an analog or digital mode selector). In one example, the communication sub-system 1040 sends and receives data over one or more channels.

The memory resources 1020 can store mode instructions 1023 corresponding to a plurality of control modes 1022, as described herein, which can be executed by the processor 1010 to initiate a particular mode. Certain executing mode instructions 1023 can initiate the communication sub-system 1040 to establish one or more wireless communication links with the self-propelled device and/or the mobile computing device. Execution of a control mode 1022 by the processor 1010 may cause the processor 1010 to generate distinct feedback responses using the feedback mechanism 1030 based on sensor data from the sensor(s) 1060 indicating user gestures performed by the user.

In some examples, the memory resources 1020 can comprise a number of state machines 1024 which can provide state machine reports 1027 to the processor 1010 can specified sensor patterns are identified by respective states machines 1024. Each state machine 1024 may monitor for a single sensor pattern which, if identified by that state machine 1024, can cause the state machine 1024 to transition states, thereby providing a state machine report 1027 to the processor 1010 identifying the user gesture performed. The processor 1010 can translate the state machine reports 1027—which indicate the user gestures—in accordance with an executing set of mode instructions 1023 in order to generate a corresponding output via the feedback mechanism 1030 and/or control commands 1012 to be communicated to the self-propelled device via the communication sub-system 1040.

While examples of FIG. 8, FIG. 9, and FIG. 10 provide for a computer system 800, a computing device 900, and a portable sensing device 1000 for implementing aspects described, in some variations, other devices of the three can be arranged to implement some or all of the functionality described with the processing resources of the self-propelled device 250 of FIG. 2, the mobile computing device 320 of FIG. 3A, or the wearable device 102 of FIG. 1A, as shown and described throughout.

CONCLUSION

It is contemplated for examples described herein to extend to individual elements and concepts described herein, independently of other concepts, ideas or system, as well as for examples to include combinations of elements recited anywhere in this application. Although examples are described in detail herein with reference to the accompanying drawings, it is to be understood that this disclosure is not limited to those precise examples. As such, many modifications and variations will be apparent to practitioners skilled in this art. Accordingly, it is intended that the scope of this disclosure be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude the inventor from claiming rights to such combinations.

What is claimed is:

1. A system comprising:
a wearable device, including:
a wireless communication module to communicate the control commands to a self-propelled device;
a selectable component to enable the user to perform an initial directional calibration with the self-propelled device; and
one or more sensors, configured to be worn by a user, the wearable device generating control commands based on user gestures performed by the user utilizing the wearable device; and
a self-propelled device comprising:
a wireless communication module to wirelessly connect with the wearable device and receive the control commands from the wearable device;
an internal drive system operable to control movement of the self-propelled device; and
a control system to implement the control commands on the internal drive system to accelerate and maneuver the self-propelled device in accordance with the user gestures.

2. The system of claim 1, wherein the wearable device comprises a wrist-worn device operable in a plurality of modes, and wherein detection of a distinct user gesture by a controller of the wearable device causes the controller to override a current mode and execute a drive mode corresponding to operative control of the self-propelled device.

3. The system of claim 1, wherein the wearable device comprises one or more output devices, and wherein the one or more output devices include a haptic system, an audio system, and a visual system.

4. The system of claim 1, wherein the selectable component comprises an analog button on the wrist-worn device, and wherein the initial directional calibration comprises depressing the analog button when the wrist-worn device is forward directionally aligned with the self-propelled device.

5. The system of claim 1, wherein the wearable device further comprises an induction interface configured to establish a communication link between the wearable device and the self-propelled device once the wearable device and the self-propelled device are within inductive range.

6. The system of claim 2, wherein the user gestures comprise (i) raising an arm, on which the wrist-worn device is attached, to accelerate the self-propelled device, (ii) lowering the arm to decelerate the self-propelled device, and (iii) performing lateral gestures with the arm to steer the self-propelled device.

7. The system of claim 6, wherein the wearable device initially interprets the lateral gestures according to a first set of directional commands, and wherein, after the user performs a vertical arm gesture that exceeds a threshold angle, the wearable device interprets the lateral gestures according to a second set of directional commands.

8. The system of claim 7, wherein the first set of directional commands correspond to turn commands to turn the self-propelled device, and wherein the second set of directional commands corresponds to an inverse of the turn commands triggered by the vertical arm gesture exceeding the threshold angle.

9. The system of claim 5, wherein the communication link comprises a BLUETOOTH low energy link.

10. The system of claim 1, wherein the one or more sensors comprises an inertial measurement unit generating raw sensor data based on the user gestures, wherein the control commands are generated by the wearable device based on the raw sensor data.

11. The system of claim 10, wherein the wearable device further comprises:
a controller implementing a plurality of state machines, each respective state machine being associated with a sensor data signature corresponding to a specified user gesture, and wherein the respective state machine executes a state transition when the raw sensor data correlates with the sensor data signature, the state transition causing the controller to generate an associated control command executable by the self-propelled device.

12. A wearable device to be worn by a user, the wearable device comprising:
one or more sensors to detect user gestures performed by the user;
a calibration feature that is capable of generating a calibration signal to calibrate a self-propelled device, wherein the calibration signal includes a command to initiate a spin by the self-propelled device;
a wireless communication module to establish a communication link with the self-propelled device; and
a controller to:
generate control commands based on the user gestures, the control commands being executable to accelerate and maneuver the self-propelled device; and
transmit the control commands to the self-propelled device over the communication link.

13. The wearable device of claim 12, wherein the wearable device is a wrist-worn device, and wherein the user gestures comprise (i) raising an arm, on which the wrist-worn device is attached, to accelerate the self-propelled device, (ii) lowering the arm to decelerate the self-propelled device, and (iii) performing lateral gestures with the arm to steer the self-propelled device.

14. The wearable device of claim 13, wherein the controller initially interprets the lateral gestures according to a first set of directional commands, and wherein, after the user performs a vertical arm gesture that exceeds a threshold angle, the wearable device interprets the lateral gestures according to a second set of directional commands.

15. The wearable device of claim 14, wherein the first set of directional commands correspond to turn commands to turn the self-propelled device, and wherein the second set of directional commands corresponds to an inverse of the turn commands triggered by the vertical arm gesture exceeding the threshold angle.

16. The wearable device of claim 12, wherein the communication link comprises a BLUETOOTH low energy link.

17. The wearable device of claim 12, wherein the one or more sensors comprise an inertial measurement unit generating raw sensor data based on the user gestures, wherein the control commands are generated by the wearable device based on the raw sensor data.

18. The wearable device of claim 16, wherein the controller implements a plurality of state machines, each respective state machine being associated with a sensor data signature corresponding to a specified user gesture, and wherein the respective state machine executes a state transition when the raw sensor data correlates with the sensor data signature, the state transition causing the controller to generate an associated control command executable by the self-propelled device.

19. A computer-implemented method of controlling a self-propelled device, the method being performed by one or more processors of a wearable device and comprising:

sending a calibration signal to control the self-propelled device, wherein the calibration signal includes a command to initiate the spin in a self-propelled device;

detecting, using one or more sensors, user gestures performed by a user wearing the wearable device;

based on user gestures, generating control commands executable to accelerate and maneuver the self-propelled device; and transmitting the control commands to the self-propelled device over a wireless communication link.

* * * * *